US012609092B2

(12) United States Patent
Morita et al.

(10) Patent No.: US 12,609,092 B2
(45) Date of Patent: Apr. 21, 2026

(54) DRIVER FOR CHARGE COMPENSATION, ELECTRO-OPTICAL DEVICE AND ELECTRONIC APPARATUS USING THEREOF

(71) Applicant: SEIKO EPSON CORPORATION, Tokyo (JP)

(72) Inventors: Akira Morita, Chino (JP); Chihiro Shin, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 481 days.

(21) Appl. No.: 18/190,999

(22) Filed: Mar. 28, 2023

(65) Prior Publication Data

US 2023/0317025 A1 Oct. 5, 2023

(30) Foreign Application Priority Data

Mar. 28, 2022 (JP) ................................ 2022-051174

(51) Int. Cl.
*G09G 3/36* (2006.01)
*G09G 3/20* (2006.01)
*G09G 3/30* (2006.01)

(52) U.S. Cl.
CPC ............. *G09G 3/36* (2013.01); *G09G 3/2096* (2013.01); *G09G 3/30* (2013.01); *G09G 2300/043* (2013.01); *G09G 2310/0202* (2013.01); *G09G 2310/0248* (2013.01); *G09G 2330/021* (2013.01)

(58) Field of Classification Search
CPC ........................................................ G09G 3/36
See application file for complete search history.

(56) References Cited

U.S. PATENT DOCUMENTS

| | | | | |
|---|---|---|---|---|
| 2016/0111035 A1 | 4/2016 | Morita | | |
| 2016/0111038 A1* | 4/2016 | Morita | ................ | G09G 3/2092 345/212 |
| 2016/0111058 A1* | 4/2016 | Morita | ................ | G09G 3/3688 345/87 |
| 2016/0133219 A1* | 5/2016 | Morita | ................ | G09G 3/3688 345/99 |

(Continued)

FOREIGN PATENT DOCUMENTS

| | | |
|---|---|---|
| JP | 2016080807 | 5/2016 |
| JP | 2016109837 | 6/2016 |

*Primary Examiner* — William Boddie
*Assistant Examiner* — Andrew B Schnirel
(74) *Attorney, Agent, or Firm* — JCIPRNET

(57) ABSTRACT

A driver includes a data voltage output terminal electrically coupled to a data line through a data line switch of an electro-optical panel, a capacitor driving circuit configured to output first to nth capacitor driving voltages corresponding to gradation data to first to nth capacitor driving nodes, a capacitor circuit including first to nth capacitors provided between an output node and the first to nth capacitor driving nodes, a processing circuit configured to calculate an excess/deficient charge amount of the output node when the data line switch is turned on, and a charge compensation circuit configured to inject into the output node or discharge from the output node a compensation charge based on the excess/deficient charge amount calculated by the processing circuit, by using a charge compensation capacitor circuit.

11 Claims, 26 Drawing Sheets

(56) References Cited

U.S. PATENT DOCUMENTS

| | | | | |
|---|---|---|---|---|
| 2016/0163284 | A1* | 6/2016 | Morita | H03M 1/0863 345/215 |
| 2016/0163285 | A1 | 6/2016 | Morita | |
| 2021/0082332 | A1* | 3/2021 | Morita | G09G 3/20 |
| 2021/0082363 | A1* | 3/2021 | Morita | G02F 1/13306 |
| 2023/0306923 | A1* | 9/2023 | Bansho | G09G 3/3674 |
| 2023/0317025 | A1* | 10/2023 | Morita | G09G 3/2096 345/212 |

* cited by examiner

| CAPACITOR OF CAPACITOR CIRCUIT | C11 | C10 | C9 | C8 | C7 | C6 | C5 | C4 | C3 | C2 | C1 |
|---|---|---|---|---|---|---|---|---|---|---|---|
| CAPACITANCE VALUE [pF] | 50 | 25 | 12.5 | 6.25 | 3.125 | 1.5625 | 0.78125 | 0.39063 | 0.19531 | 0.097656 | 0.048828 |
| CHARGE [pC] | 750 | 375 | 187.5 | 93.75 | 46.875 | 23.438 | 11.719 | 5.8594 | 2.9297 | 1.4648 | 0.73242 |

FIG. 10

| | |
|---|---|
| DATA LINE CAPACITANCE [pF] | 4 |
| PRECHARGE GRADATION VALUE DPRE | 0 |
| PRECHARGE VOLTAGE [V] | 2.5 |
| GRADATION VALUE FOR COEFFICIENT CALCULATION | 1024 |
| DATA VOLTAGE [V] FOR COEFFICIENT CALCULATION | 7.5 |
| EXCESS/DEFICIENT CHARGE AMOUNT [pC] | 4×(7.5−2.5)=20 |
| EXCESS/DEFICIENT GRADATION VALUE AT GRADATION VALUE 1024 | 20/0.73242=27.25 |
| COEFFICIENT Coef | 27.25/1024 |
| EQUATION FOR CALCULATING EXCESS/DEFICIENT GRADATION VALUE DCC_DQ FOR GRADATION VALUE DQ_GD | DCC_DQ=(DQ_GD−0)×(27.25/1024) |

FIG. 11

| | |
|---|---|
| PRECHARGE GRADATION VALUE | 25 |
| COEFFICIENT Coef | 27.25 |

| | GRADATION VALUE | EXCESS/DEFICIENT GRADATION VALUE | SET VALUE OF CHARGE COMPENSATION CIRCUIT | GRADATION VALUE TO CAPACITANCE DRIVING |
|---|---|---|---|---|
| DRIVING ORDER | DQ_GD | DCC_DQ | DCC | DQ |
| 1 | 1024 | 26.5 | 26.5 | 1024 |
| 2 | 1640 | 42.75 | 69.25 | 1640 |
| 3 | 1750 | 45.75 | 115 | 1750 |
| 4 | 2048 | 53.75 | 168.75 | 2048 |

FIG. 12

| | |
|---|---|
| CALCULATING GRADATION VALUE CORRESPONDING TO GRADATION VALUE DQ_GD = 0 | 512 |
| CALCULATING GRADATION VALUE CORRESPONDING TO VDH | 3072 |
| CAPACITANCE SET VALUE AT CHARGE INJECTION AT GRADATION VALUE DQ_GD AND DEFICIENT GRADATION VALUE DCC_DQ | DCC_DQ/(3072−(DQ_GD+512))*3072 |
| CAPACITANCE SET VALUE AT CHARGE DISCHARGE AT GRADATION VALUE DQ_GD AND EXCESS GRADATION VALUE DCC_DQ | −DCC_DQ/(DQ_GD+512)*3072 |

FIG. 18

| | |
|---|---|
| PRECHARGE GRADATION VALUE | 512 |
| COEFFICIENT Coef | 27.25 |

| | GRADATION VALUE | EXCESS/DEFICIENT GRADATION VALUE | CAPACITANCE SET VALUE AT CHARGE INJECTION | CAPACITANCE SET VALUE AT CHARGE DISCHARGE | GRADATION VALUE TO CAPACITANCE DRIVING |
|---|---|---|---|---|---|
| DRIVING ORDER | DQ_GD | DCC_DQ | DCCE | | DQ |
| 1 | 2048 | 40.75 | 245 | 0 | 2048 |
| 2 | 0 | −13.75 | 0 | 82.5 | 0 |
| 3 | 1024 | 13.5 | 27 | 0 | 1024 |
| 4 | 0 | −13.75 | 0 | 82.5 | 0 |

FIG. 19

| | |
|---|---|
| CALCULATING GRADATION VALUE CORRESPONDING TO GRADATION VALUE DQ_GD=0 | 512 |
| CALCULATING GRADATION VALUE CORRESPONDING TO VDH | 3072 |
| CAPACITANCE VALUE OF CAV OF COMPENSATION CAPACITOR/CAPACITANCE VALUE OF C1 OF CAPACITANCE DRIVING | 312 |
| COEFFICIENT AT CHARGE INJECTION | 312/3072 |
| CHARGE INJECTION AMOUNT AT GRADATION VALUE DQ_GD | (3072-(DQ_GD+512))*(312/3072) |
| CAPACITANCE VALUE OF CBV OF COMPENSATION CAPACITOR/CAPACITANCE VALUE OF C1 OF CAPACITANCE DRIVING | 80 |
| COEFFICIENT AT CHARGE DISCHARGE | 80/3072 |
| CHARGE DISCHARGE AMOUNT AT GRADATION VALUE DQ_GD | (DQ_GD+512)*(80/3072) |

FIG. 24

| | GRADATION VALUE | EXCESS/ DEFICIENT GRADATION VALUE | CUMULATIVE VALUE BEFORE CHARGE COMPENSATION | CHARGE INJECTION AMOUNT | CHARGE DISCHARGE AMOUNT | CUMULATIVE VALUE AFTER CHARGE COMPENSATION | EXCESS/DEFICIENT GRADATION VALUE TO CAPACITANCE DRIVING | GRADATION VALUE TO CAPACITANCE DRIVING |
|---|---|---|---|---|---|---|---|---|
| DRIVING ORDER | DQ_GD | DCC_DQ | DCCF | DCCA | | DCCB | DCCD | DQ |
| 1 | 512 | 0 | 0 | 0 | 0 | 0 | 0 | 512 |
| 2 | 256 | −7 | 7 | 0 | 0 | 7 | −7 | 249 |
| 3 | 128 | −10.25 | 17.25 | 0 | 16.67 | 0.58 | 0 | 128 |
| 4 | 1024 | 13.5 | −12.92 | 0 | 0 | −12.92 | 13 | 1037 |

| | |
|---|---|
| PRECHARGE GRADATION VALUE | 512 |
| COEFFICIENT Coef | 27.25 |
| THRESHOLD VALUE OF CHARGE INJECTION AMOUNT | 52 |
| THRESHOLD VALUE OF CHARGE DISCHARGE AMOUNT | 13.33 |

FIG. 25

DRIVER FOR CHARGE COMPENSATION, ELECTRO-OPTICAL DEVICE AND ELECTRONIC APPARATUS USING THEREOF

The present application is based on, and claims priority from JP Application Serial Number 2022-051174, filed Mar. 28, 2022, the disclosure of which is hereby incorporated by reference herein in its entirety.

BACKGROUND

1. Technical Field

The present disclosure relates to a driver, an electro-optical device, an electronic apparatus and the like.

2. Related Art

JP-A-2016-80807 discloses a driver that includes a capacitance driving circuit and an amplifier circuit and drives an electro-optical panel. The amplifier circuit performs voltage driving in which a data voltage corresponding to gradation data is output to a data voltage output terminal after the start of capacitance driving in which the electro-optical panel is driven by the capacitance driving circuit. In this manner, a drop in source line voltage after a source line switch of the electro-optical panel is turned on from an off state is compensated for by the amplifier circuit, and thus reduction in accuracy of the data voltage in the capacitance driving is suppressed.

Before the gradation voltage is supplied to a pixel node and a data line connected to the pixel node, a precharge voltage is supplied to the pixel node and the data line. After the precharge voltage is supplied, the data line and a signal supply line to which a voltage around an intended gradation voltage is supplied through capacitance driving are connected to each other via a data line switch. As a result, each time the signal supply line and the data line are connected to each other via the data line switch, the charge supplied through the capacitance driving flows to the data line side, and excess or deficiency of charge occurs. In JP-A-2016-80807, this excess or deficiency of charge is compensated for by the amplifier circuit. However, when the pixel driving time is shortened to handle the increase in the number of pixels or frame rate, the supply of the intended gradation voltage is delayed with the responsiveness of the amplifier circuit. Alternatively, when the responsiveness of the amplifier circuit is increased, the power consumption or the circuit area is increased.

SUMMARY

An aspect of the present disclosure relates to a driver including a data voltage output terminal electrically coupled to a data line through a data line switch of an electro-optical panel; a capacitor driving circuit configured to output first to nth capacitor driving voltages corresponding to gradation data to first to nth capacitor driving nodes, n being an integer of 2 or greater; a capacitor circuit including first to nth capacitors provided between an output node that is a node of the data voltage output terminal and the first to nth capacitor driving nodes; a processing circuit configured to calculate an excess/deficient charge amount, the excess/deficient charge amount being a deficient charge amount or an excess charge amount of the output node when the data line switch is turned on; and a charge compensation circuit including a charge compensation capacitor circuit and configured to inject into the output node or discharge from the output node a compensation charge based on the excess/deficient charge amount calculated by the processing circuit, by using the charge compensation capacitor circuit.

Another aspect of the present disclosure relates to an electro-optical device including the above-described driver, and the electro-optical panel.

Still another aspect of the present disclosure relates to an electronic apparatus including the above-described driver.

BRIEF DESCRIPTION OF THE DRAWINGS

FIG. 10 illustrates an example of a capacitance value of a capacitor of a capacitance driving.

FIG. 11 is a table illustrating an equation for calculating an excess/deficient gradation value.

FIG. 12 illustrates an example of calculation at driving orders 1 to 4 of a horizontal scanning period.

FIG. 18 is a table illustrating an equation for calculating a capacitance set value.

FIG. 19 illustrates an example of calculation at driving orders 1 to 4 of a horizontal scanning period.

FIG. 24 is a table illustrating an equation for calculating a charge injection amount and a charge discharge amount.

FIG. 25 illustrates an example of calculation at driving orders 1 to 4 of a horizontal scanning period.

DESCRIPTION OF EXEMPLARY EMBODIMENTS

The following is a detailed description of a preferred embodiments of the present disclosure. The embodiments described below do not unduly limit the contents of the claims, and not all of the configurations described in the embodiments are essential configuration requirements.

1. Electro-Optical Device

Figure 1:
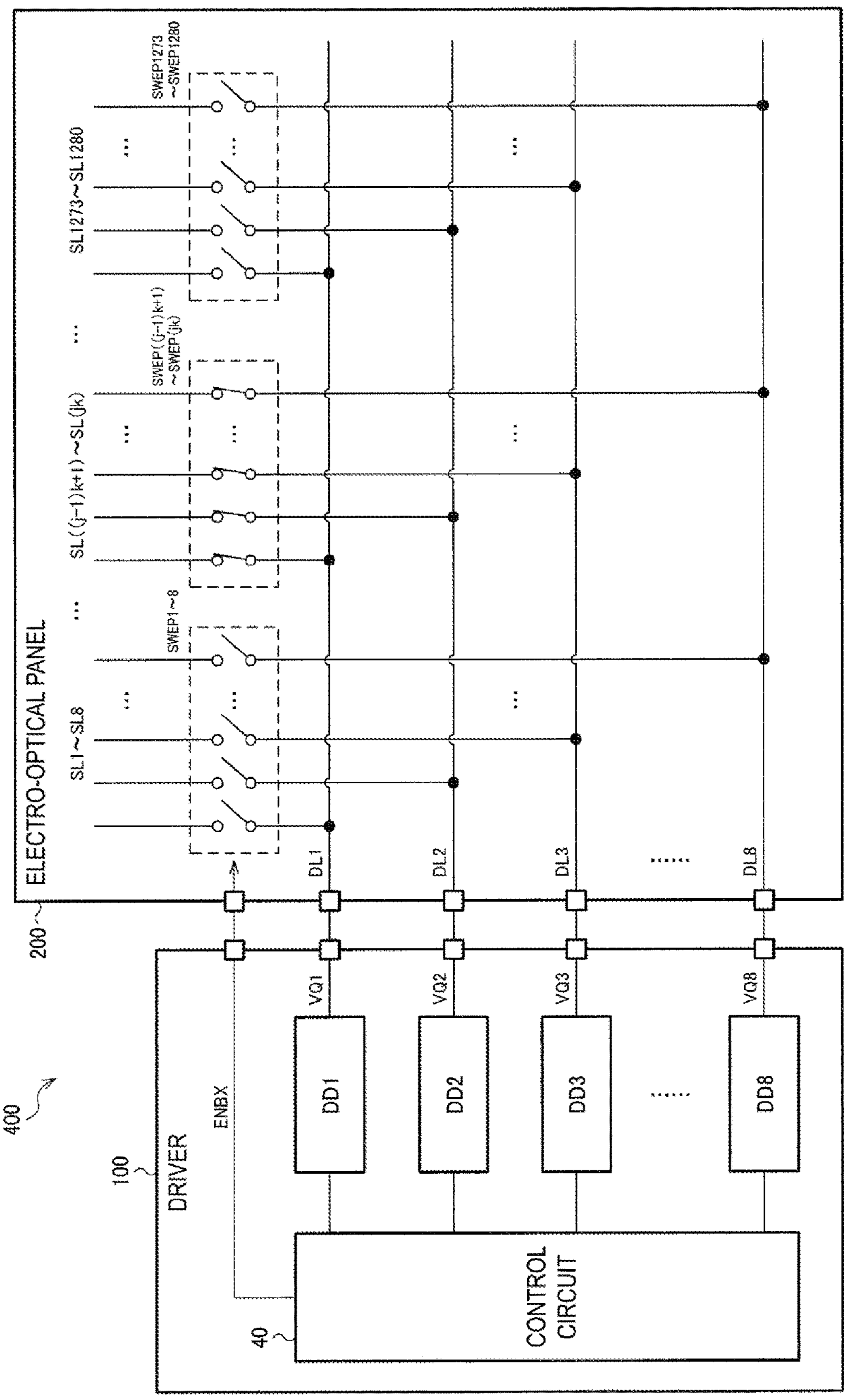
FIG. 1 illustrates an example of a configuration of an electro-optical device.

FIG. 1 illustrates an example of a configuration of an electro-optical device. An electro-optical device 400 includes a driver 100 and an electro-optical panel 200. Hereinafter, the electro-optical device 400 of a phase expansion driving type is described as an example, but this is not limitative, and the electro-optical device 400 may be a device of a demultiplex driving type, for example.

The driver 100 drives the electro-optical panel 200 by outputting a data voltage to the signal supply line of the electro-optical panel 200. A scanning line driving circuit that drives the scanning line of the electro-optical panel 200 may be included in the driver 100, or may be provided outside the driver 100. The driver 100 is an integrated circuit device in which a plurality of circuit elements is integrated on the semiconductor substrate, for example. The driver 100 includes a control circuit 40, and first to kth data line driving circuits DD1 to DDk. The k is an integer of 2 or greater. Note that hereinafter, a case of k=8 is described as an example.

The control circuit 40 outputs corresponding gradation data to each data line driving circuit of the data line driving circuits DD1 to DD8. In addition, the control circuit 40 outputs a control signal ENBX that controls a data line switch to the electro-optical panel 200.

The data line driving circuits DD1 to DD8 convert gradation data into a data voltage, and outputs the data voltage to the signal supply lines DL1 to DL8 of the electro-optical panel 200 as output voltages VQ1 to VQ8.

The electro-optical panel 200 includes the first to eighth signal supply lines DL1 to DL8, first to 1280th data line switches SWEP1 to SWEP1280, and first to 1280th data lines SL1 to SL1280. The number of the data lines may be k×t. The t is an integer of 2 or greater. Here, WXGA is taken as an example, and t=160 holds.

In the data line switches SWEP1 to SWEP1280, one ends of the data line switches SWEP((j−1)×k+1) to SWEP(j×k) are connected to the signal supply lines DL1 to DL8. The j is an integer of 160 or smaller. In the case of j=1, they are the data line switches SWEP1 to SWEP8, for example.

Each of the data line switches SWEP1 to SWEP1280 is composed of a TFT and the like, and is controlled based on the control signal ENBX, for example. TFT is an abbreviation of Thin Film Transistor. For example, the electro-optical panel 200 includes a switch control circuit not illustrated in the drawing, and this switch control circuit controls the data line switches SWEP1 to SWEP1280 on or off on the basis of the control signal ENBX.

The data line driving circuits DD1 to DD8 perform the driving 160 times in the horizontal scanning period, and, in the jth driving thereof, the data line switches SWEP((j−1)×k+1) to SWEP(j×k) are on while other data lines are off. In this manner, the data line SL((j−1)×k+1) to SL(j×k) are driven in the jth driving. Focusing on the data line driving circuit DD1, in the horizontal scanning period, the data line switches SWEP1, SWEP2, . . . , SWEP1273 sequentially turn on, and the data line driving circuit DD1 sequentially drives data lines SL1, SL2 . . . , SL1273.

2. First Embodiment

Figure 2:
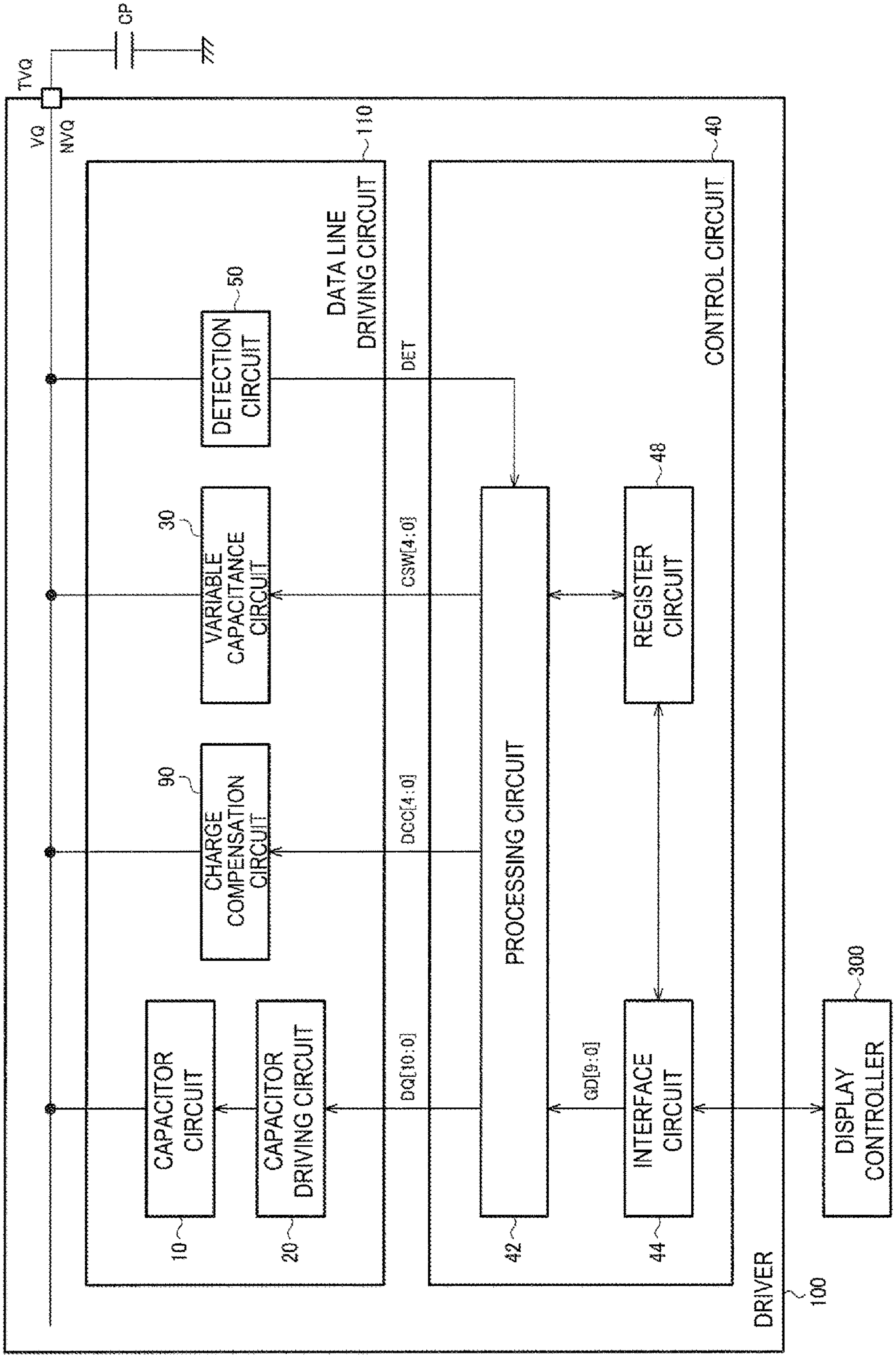
FIG. 2 illustrates an example of a first specific configuration of a driver.

FIG. 2 illustrates an example of a first specific configuration of a driver. The driver 100 includes a data line driving circuit 110 and the control circuit 40. The data line driving circuit 110 corresponds to any one of the data line driving circuits DD1 to DD8 of FIG. 1.

The data line driving circuit 110 includes a capacitor circuit 10, a capacitor driving circuit 20, a charge compensation circuit 90, a variable capacitance circuit 30, and a detection circuit 50. The control circuit 40 includes a processing circuit 42, an interface circuit 44, and a register circuit 48.

The interface circuit 44 performs an interface process between the driver 100 and a display controller 300 that controls the driver 100. The interface circuit 44 outputs gradation data GD [9:0] received from the display controller 300 to the processing circuit 42. Note that the number of bits of the gradation data to be received may be any numbers. The interface circuit 44 is an image interface circuit of an LVDS type, a parallel RGB type, a display port type or the like, for example. LVDS is an abbreviation of Low Voltage Differential Signaling.

In an initialization process at the time when the power is turned on to the driver 100 and the like, the processing circuit 42 determines setting data CSW [4:0] of the capacitance value of the variable capacitance circuit 30, and stores the setting data CSW [4:0] in the register circuit 48. In a normal operation of driving the electro-optical panel 200, the processing circuit 42 sets the capacitance value of the variable capacitance circuit 30 with the setting data CSW [4:0] read from the register circuit 48. In addition, the processing circuit 42 outputs gradation data DQ [10:0] for capacitance driving to the capacitor driving circuit 20 on the basis of the gradation data GD [9:0].

An output node NVQ is a node connected to a data voltage output terminal TVQ, and the voltage of this output node NVQ is set as an output voltage VQ. The load capacitance of the data voltage output terminal TVQ is set as an electro-optical panel side capacitance CP. The capacitor driving circuit 20 drives the capacitor circuit 10 on the basis of the gradation data DQ [10:0]. In this manner, the capacitor circuit 10 supplies charge to the output node NVQ, and this charge is redistributed among the capacitor circuit 10, the variable capacitance circuit 30 and the electro-optical panel side capacitance CP. In this manner, the output voltage VQ becomes a data voltage corresponding to the gradation data DQ [10:0].

Figure 3:
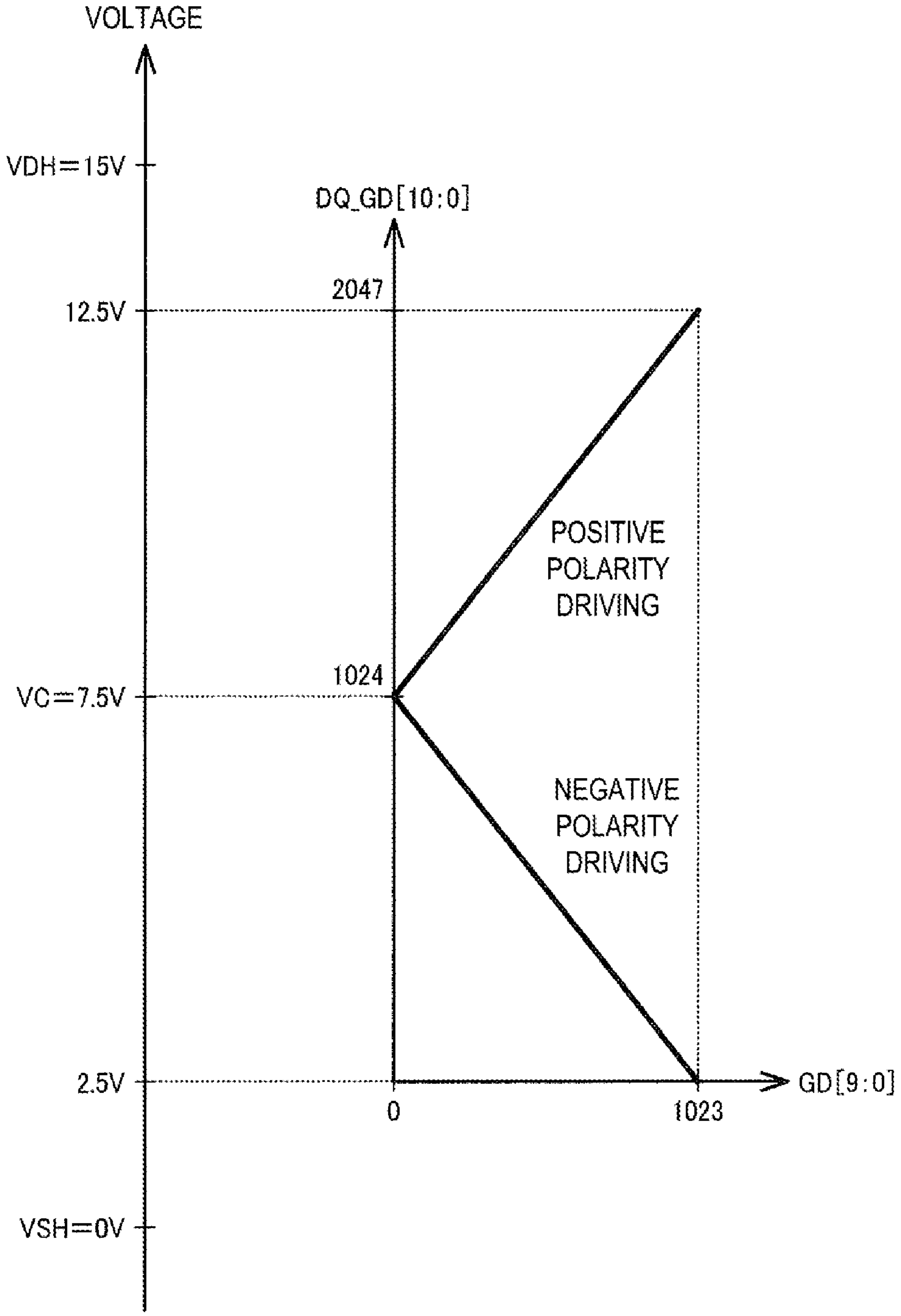
FIG. 3 is a diagram for describing a relationship between gradation data and a data voltage.

FIG. 3 is a diagram for describing a relationship between gradation data and a data voltage. The processing circuit 42 converts the input gradation data GD [9:0] into gradation data DQ_GD [10:0]. More specifically, the processing circuit 42 converts the gradation values 0 to 1023 of the gradation data GD [9:0] into the gradation values 1023 to 0 of the gradation data DQ_GD [10:0] during negative polarity driving, and converts the gradation values 0 to 1023 of the gradation data GD [9:0] into the gradation values 1024 to 2047 of the gradation data DQ_GD [10:0] during positive polarity driving.

VSH=0 V is a low potential side power source voltage of the capacitor driving circuit 20. VDH=15 V is a high potential side power source voltage of the capacitor circuit 10. The common voltage supplied to the counter electrode of the electro-optical panel 200 is VC=7.5 V. The data voltage supplied to a pixel is 7.5 V to 2.5 V during negative polarity driving, and is 7.5 V to 12.5 V during positive polarity driving.

In the first embodiment, the processing circuit 42 outputs, to the capacitor driving circuit 20, the gradation data DQ_GD [10:0] as the gradation data DQ [10:0] for capacitance driving. It should be noted that in some embodiments described later, the processing circuit 42 generates the gradation data DQ [10:0] for capacitance driving by adding a charge compensating excess/deficient gradation value to the gradation data DQ_GD [10:0].

The charge compensation circuit 90 compensates for the deficient charge or the excess charge of the output node NVQ that is generated when the data line switch of the electro-optical panel 200 is turned on from an off state. While the output voltage VQ is shifted from the data voltage due to the deficient charge or excess charge, the output voltage VQ can be brought closer to the data voltage when the charge compensation circuit 90 injects into the output node NVQ or discharges from the output node NVQ a compensation charge that compensates for the deficient charge or excess charge. The charge compensation circuit 90 compensates for the charge faster than the amplifier circuit by performing the charge compensation through the charge redistribution using a capacitor.

The processing circuit 42 calculates setting data DCC [4:0] that sets the compensation charge amount on the basis of the gradation data DQ_GD [10:0], and the charge compensation circuit 90 injects into the output node NVQ or discharges from the output node NVQ the compensation charge on the basis of the setting data DCC [4:0]. Note that the number of bits of the setting data may be any numbers.

A method of determining the capacitance value of the variable capacitance circuit 30 and an example of a configuration of the variable capacitance circuit 30 are described below.

The detection circuit 50 compares a given detection voltage and the output voltage VQ, and outputs the result of the comparison as a detection signal DET. The detection circuit 50 is a comparator, for example.

The processing circuit 42 outputs the gradation data DQ [10:0] corresponding to a given data voltage to the capacitor driving circuit 20. At this time, the above-mentioned given detection voltage is set to the same voltage as the given data voltage, which is an expected value of the output voltage VQ. The processing circuit 42 sequentially changes the capacitance value of the variable capacitance circuit 30 by sequentially changing the value of the setting data CSW [4:0]. The processing circuit 42 determines the capacitance value of the variable capacitance circuit 30 on the basis of the detection signal DET at each capacitance value. Specifically, the processing circuit 42 determines a capacitance value with which the output voltage VQ becomes a given detection voltage on the basis of the detection signal DET, and stores the setting data CSW [4:0] of the capacitance value in the register circuit 48.

The variable capacitance circuit 30 includes first to fifth adjusting capacitors and first to fifth adjusting switches. One end of the first adjusting switch is connected to the output node NVQ, and the other end is connected to one end of the first adjusting capacitor. The other end of the first adjusting capacitor is connected to the ground node. The same applies to the second to fifth adjusting capacitors and the second to fifth adjusting switches. The capacitance values of the first to fifth adjusting capacitors are binary weighted. The first adjusting switch is controlled on or off by the CSW [0]. Likewise, the second to fifth adjusting switches are controlled on or off by the CSW [1] to CSW [4].

Figure 4:
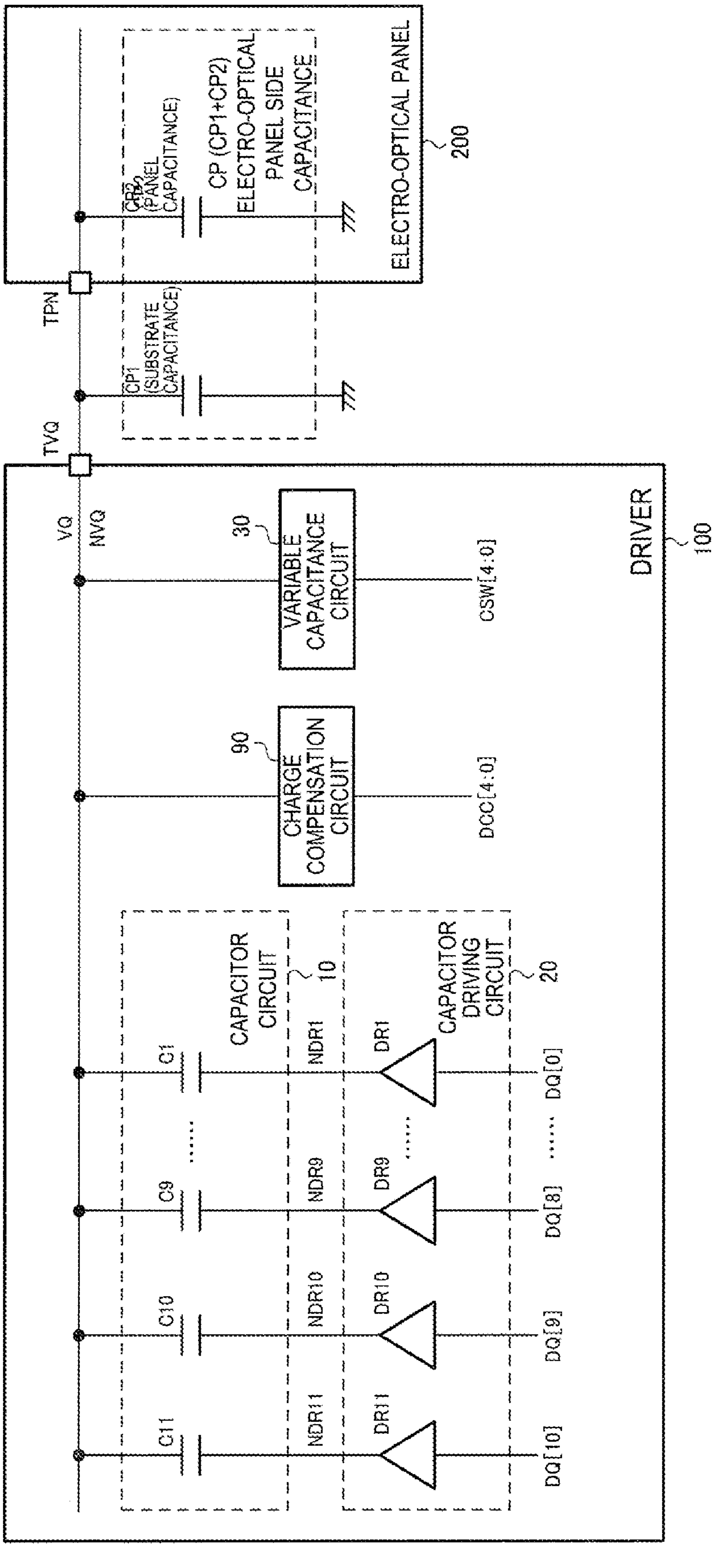
FIG. 4 illustrates examples of specific configurations of a capacitor circuit and a capacitor driving circuit, and an example of an electro-optical panel side capacitance.

FIG. 4 illustrates examples of specific configurations of a capacitor circuit and a capacitor driving circuit, and an example of an electro-optical panel side capacitance. Note that hereinafter, as the reference sign representing a capacitance value of a capacitor, the same reference sign as the reference sign of the capacitor is used. For example, the capacitance value of the capacitor C1 is denoted as C1. In addition, as the reference sign representing a value indicated by data, the same reference sign as the reference sign of the data is used. For example, when focusing on the gradation value of the gradation data DQ [10:0], its gradation value is represented by DQ.

The capacitor circuit 10 includes first to nth capacitors C1 to Cn. The capacitor driving circuit 20 includes first to nth driving circuits DR1 to DRn. While an example of n=10 is described below, it suffices that n is an integer of 2 or greater. It suffices that n is set to the same number as the number of bits of the gradation data DQ [10:0].

One end of the capacitor Ci is connected to the output node NVQ, and the other end is connected to a capacitor driving node NDRi. The i is an integer from 1 to n=10. The capacitors C1 to C10 have binary weighted capacitance values. More specifically, the capacitance value of the capacitor Ci is $2^{(i-1)}\times C1$.

The processing circuit 42 outputs the $i^{th}$ bit DQ [i−1] of the gradation data DQ [10:0] to the input node of the driving circuit DRi. The driving circuit DRi outputs a first voltage level to the capacitor driving node NDRi when the bit DQ [i−1] is at a first logic level, and outputs a second voltage level to the capacitor driving node NDRi when the bit DQ [i−1] is at a second logic level. For example, the first logic level is "0", the second logic level is "1", the first voltage level is a low potential side power source voltage VSH, and the second voltage level is a high potential side power source voltage VDH. The driving circuit DRi is composed of a level shifter that level-shifts the input logic level to the output voltage level of the driving circuit DRi, and a buffer circuit that buffers the output of the level shifter, for example.

When driving circuits DR1 to DR11 drive the capacitors C1 to C11, charge redistribution occurs among the capacitors C1 to C11, the variable capacitance circuit 30 and the electro-optical panel side capacitance CP. As a result, a data voltage is output to the output node NVQ.

The electro-optical panel side capacitance CP is the total capacitance as seen from the data voltage output terminal TVQ. For example, the electro-optical panel side capacitance CP is the sum of a substrate capacitance CP1 that is a parasitic capacitance of a printed board, and a panel capacitance CP2 that is a parasitic capacitance in the electro-optical panel 200. The printed board is a substrate on which the driver 100 is mounted and which is connected to the electro-optical panel 200.

It is assumed that the sum of the capacitance values of the capacitors C1 to C11 is Ctot=C1+C2+ . . . +C11, and that the capacitance value of the variable capacitance circuit 30 is CF. As an example, CF is set such that Ctot/(CF+CP)=2 is obtained. In this case, at a maximum gradation value DQ=2047, VQ=15 V×{Ctot/(Ctot+CF+CP)}+2.5 V=10 V+2.5 V=12.5 V is obtained. At a minimum gradation value DQ=0, VQ=0 V×{Ctot/(Ctot+CF+CP)}+2.5 V=0 V+2.5

V=2.5 V is obtained. In FIG. 3, when DQ=DQ_GD is set, the same data voltage as that of the example of FIG. 3 is achieved.

Note that the charge of the output node NVQ is initialized in a blanking period and the like. As an example, an initializing voltage 2.5 V is supplied to the output node NVQ, and the gradation data DQ [10:0] of the gradation value DQ=0 indicating that voltage is input to the capacitor driving circuit 20.

Figure 5:
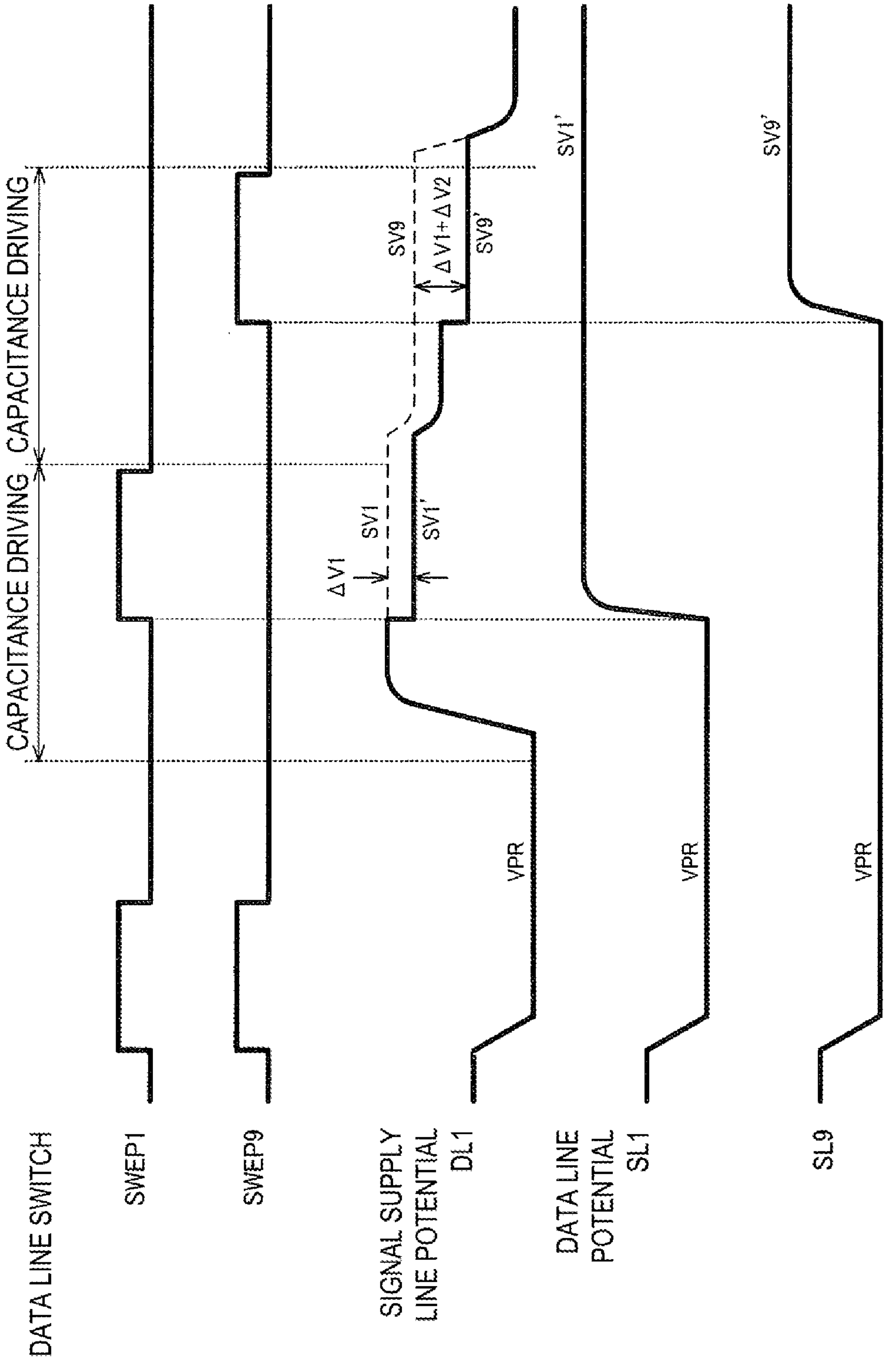
FIG. 5 illustrates an example of a signal waveform of a case where a charge compensation circuit of an embodiment is not used.

FIG. 5 illustrates an example of a signal waveform of a case where a charge compensation circuit of this embodiment is not used. The following describes an example of a signal waveform related to the data lines SL1 and SL9 in one horizontal scanning period in an example in which the data line driving circuit 110 is the data line driving circuit DD1 of FIG. 1.

The data line switches SWEP1 and SWEP9 turn on, and the data line driving circuit DD1 outputs a precharge voltage VPR. In this manner, the signal supply line DL1 and the data lines SL1 and SL9 are charged with the precharge voltage VPR. Next, the data line switches SWEP1 and SWEP9 turn off.

Next, the data line driving circuit DD1 starts the capacitance driving, and the signal supply line DL1 is charged with a data voltage SV1. Next, the data line switch SWEP1 is turned on, the signal supply line DL1 and the data line SL1 are connected to each other, the data line SL1 is charged, and the data line switch SWEP1 is turned off. Before the signal supply line DL1 and the data line SL1 are connected to each other, the signal supply line DL1 is at the data voltage SV1 and the data line SL1 is at the precharge voltage VPR, and therefore, when the signal supply line DL1 and the data line SL1 are connected to each other, charge redistribution occurs and the voltage of the signal supply line DL1 is shifted from SV1 to SV1'. When this shift is represented by ΔV1, SV1'=SV1−ΔV1 holds. SV1'<SV1 holds in the case of SV1>VPR, whereas SV1'>SV1 holds in the case of SV1<VPR. This voltage SV1' is written to the data line SL1.

Next, the data line driving circuit DD1 starts the capacitance driving, and a signal supply line DL9 is charged. While the target voltage is a data voltage SV9, the signal supply line DL9 is charged with a voltage SV9−ΔV1 because it is shifted by the above-mentioned ΔV1. Next, the data line switch SWEP9 is turned on, the signal supply line DL1 and the data line SL9 are connected to each other, the data line SL9 is charged, and the data line switch SWEP9 is turned off. When the signal supply line DL1 and the data line SL9 are connected to each other, charge redistribution occurs, and the voltage of the signal supply line DL1 is shifted from SV9−ΔV1 to SV9'=SV9−ΔV1−ΔV2. This voltage SV9' is written to the data line SL9.

In the above-described manner, when the data line switch is turned on and the signal supply line and the data line are connected to each other, the charge of the signal supply line is transferred to the data line and the data line switch is thereafter turned off. In the capacitance driving, it is necessary to conserve the charge of the output node, but the above-mentioned charge transfer results in excess or deficiency of charge, making charge conservation in capacitance driving impossible. In the above-described JP-A-2016-80807, the amplifier circuit is used to compensate for the excess/deficient charge, but the power consumption or circuit area of the amplifier circuit increases as the number of pixels or frame rate increases.

Figure 6:
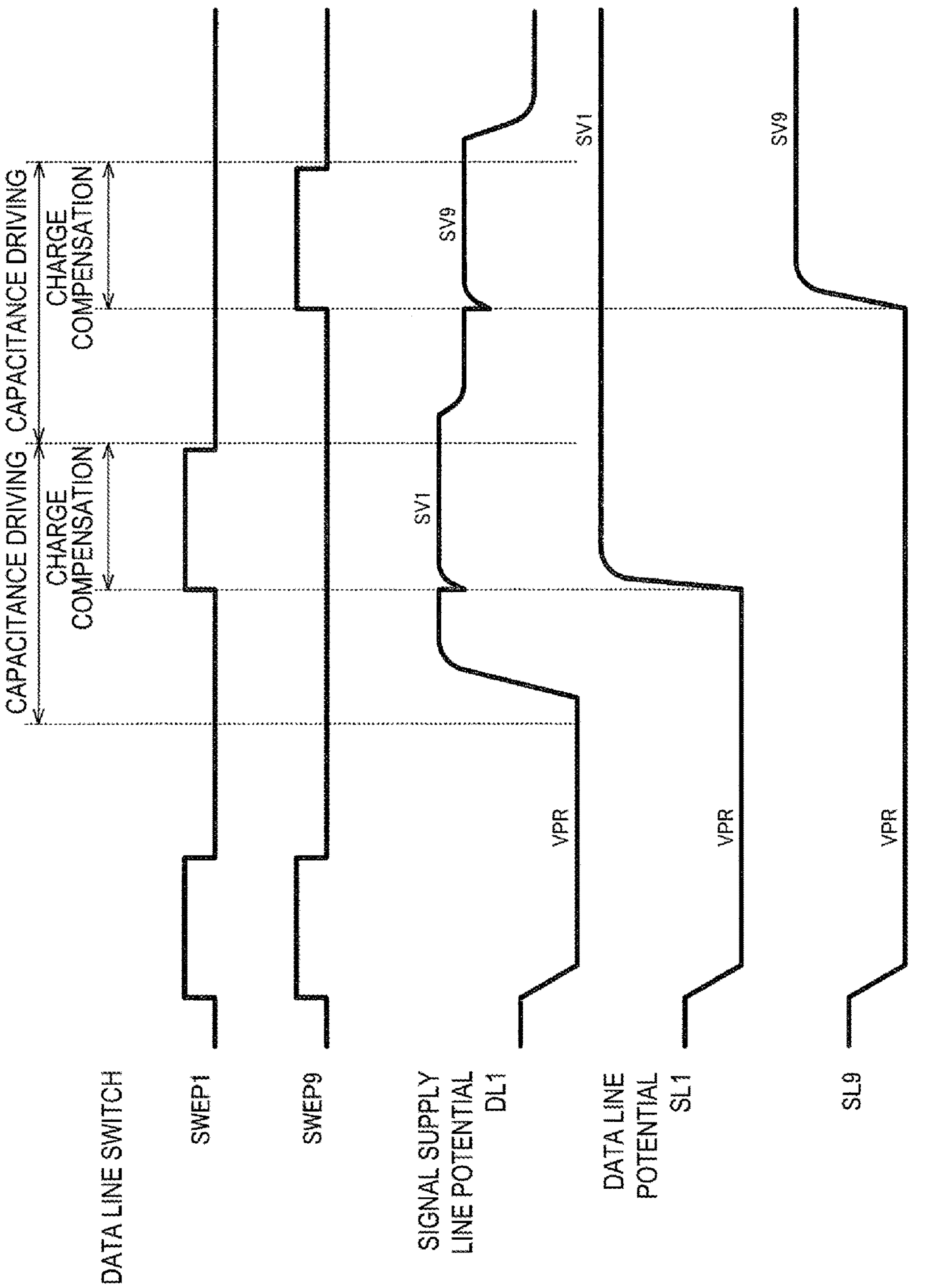
FIG. 6 illustrates an example of a first signal waveform of a case where the charge compensation circuit of the embodiment is used.

FIG. 6 illustrates an example of a first signal waveform of a case where a charge compensation circuit of this embodiment is used. FIG. 6 illustrates an example of a signal waveform of a case where charge compensation is started at the timing when the data line switch is turned on.

The charge compensation circuit 90 injects into the output node NVQ or discharges from the output node NVQ the compensation charge corresponding to ΔV1 at the timing when the data line switch SWEP1 is turned on from an off state. The charge compensation circuit 90 injects the charge in the case of SV1>VPR, and discharges the charge in the case of SV1<VPR. Likewise, the charge compensation circuit 90 injects into the output node NVQ or discharges from the output node NVQ the compensation charge corresponding to ΔV2 at the timing when the data line switch SWEP9 is turned on from an off state.

The processing circuit 42 updates a set value DCC of the setting data DCC [4:0] to the charge compensation circuit 90 at the timing when the data line switch is turned on from an off state. In this manner, the charge compensation is started at the timing when the data line switch is turned on from an off state. The set value DCC is a set value of the compensation charge amount, and the method of determining the set value DCC will be described later.

Figure 7:
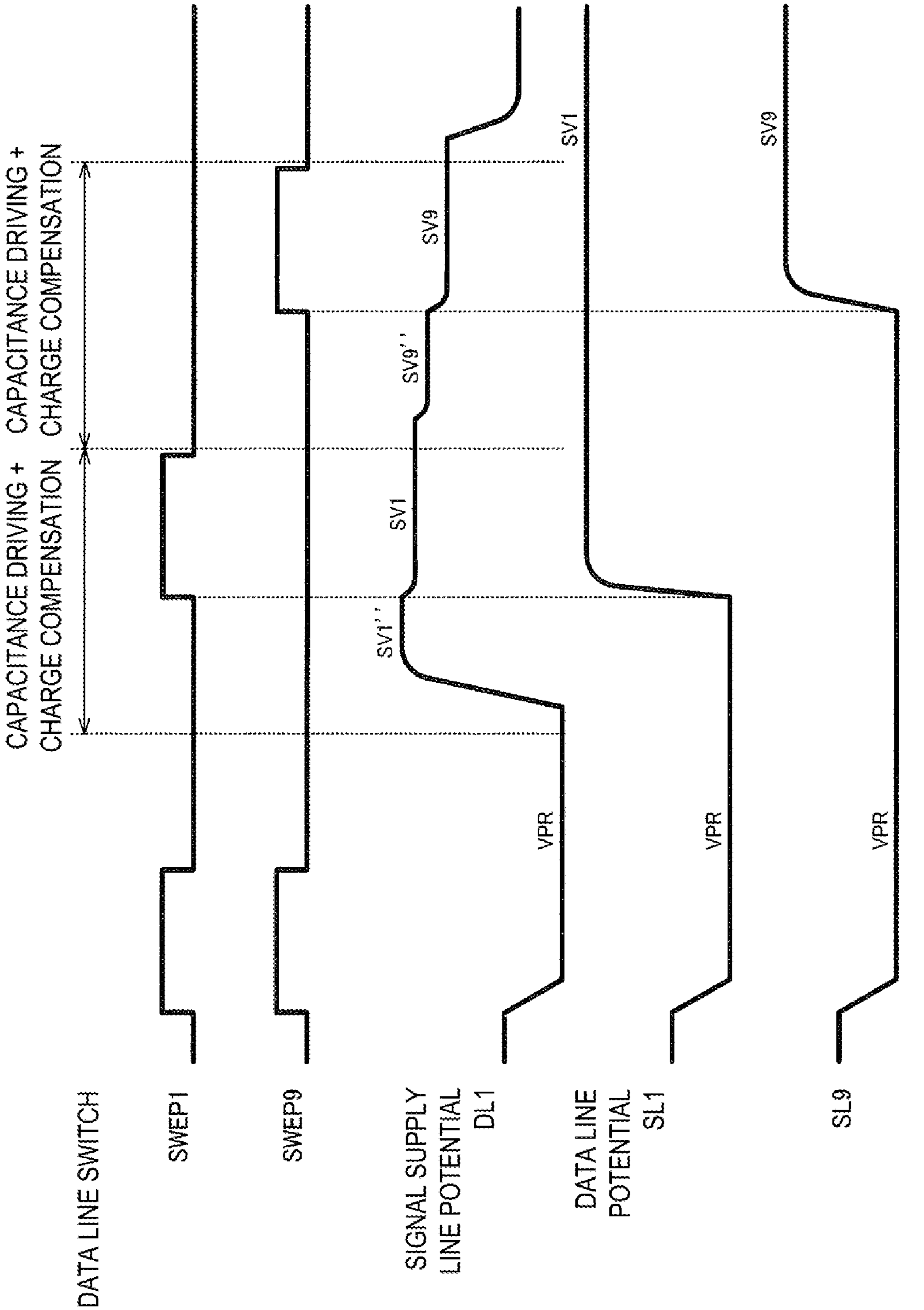
FIG. 7 illustrates an example of a second signal waveform of a case where the charge compensation circuit of the embodiment is used.

FIG. 7 illustrates an example of a second signal waveform of a case where a charge compensation circuit of this embodiment is used. FIG. 7 illustrates an example of a signal waveform of a case where charge compensation is started at the timing of starting the capacitance driving.

The charge compensation circuit 90 injects into the output node NVQ or discharges from the output node NVQ the compensation charge corresponding to ΔV1 at the timing of starting the capacitance driving. As a result, the voltage of the signal supply line DL1 becomes SV1". In the case of SV1>VPR, SV1">SV1 holds because the charge compensation circuit 90 injects charge. In the case of SV1<VPR, SV1"<SV1 holds because the charge compensation circuit 90 discharges charge. When the data line switch SWEP9 is turned on from an off state, the voltage of the signal supply line DL1 and the data line SL1 becomes the data voltage SV1 through the charge redistribution. Likewise, the charge compensation circuit 90 injects into the output node NVQ or discharges from the output node NVQ the compensation charge corresponding to ΔV2 at the timing of starting the capacitance driving. As a result, the voltage of the signal supply line DL1 becomes SV9". When the data line switch SWEP9 is turned on from an off state, the voltage of the signal supply line DL1 and the data line SL9 becomes the data voltage SV9.

The processing circuit 42 updates the set value DCC of the setting data DCC [4:0] to the charge compensation circuit 90 at the timing of starting the capacitance driving. In this manner, the charge compensation is started at the timing of starting the capacitance driving.

In the above-described manner, by compensating for the excess/deficient charge through the charge redistribution by using the charge compensation circuit 90, the voltage of the data line can be speedily made asymptotically closer to the data voltage in comparison with the case where the amplifier circuit is used. In addition, even in the case where an amplifier circuit is further additionally used, the charge amount to be compensated by the amplifier circuit can be reduced.

Figure 8:
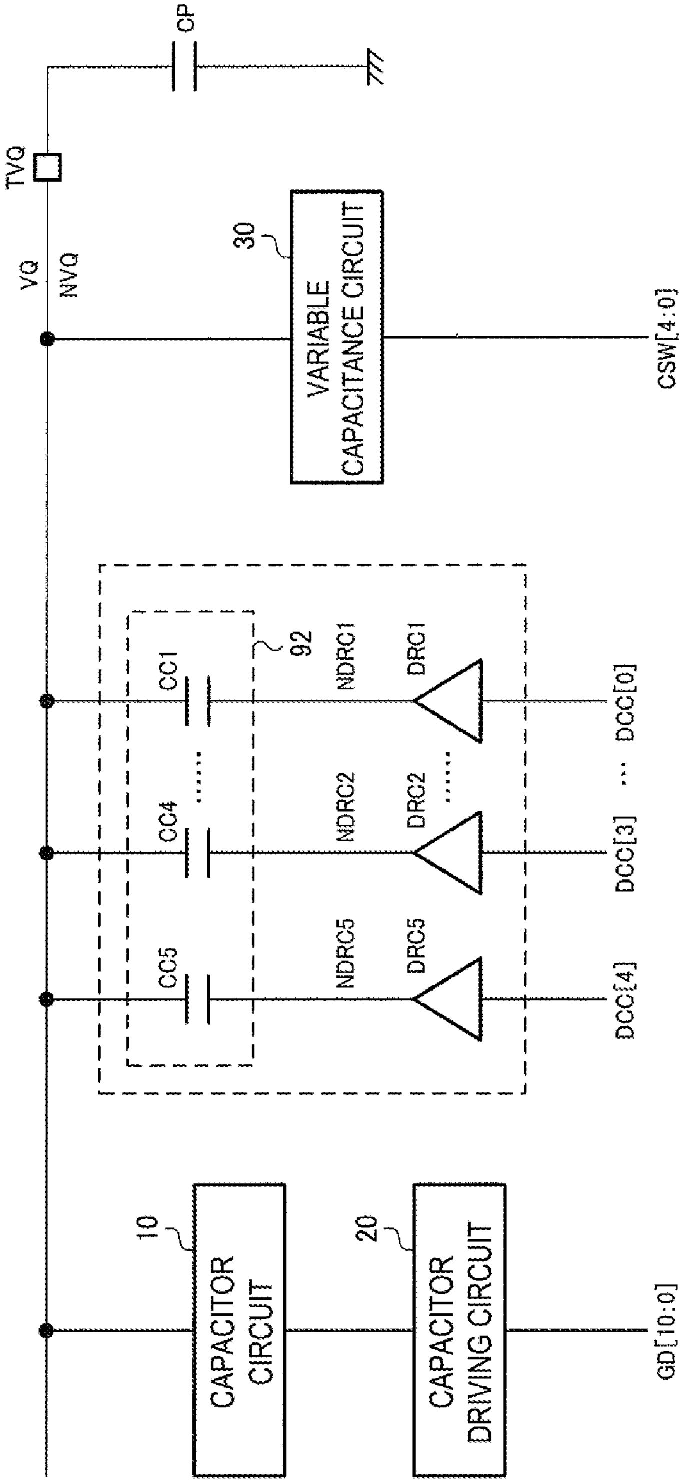
FIG. 8 illustrates an example of a first specific configuration of the charge compensation circuit.

FIG. 8 illustrates an example of a first specific configuration of a charge compensation circuit. The charge compensation circuit 90 includes a charge compensation capacitor circuit 92 and first to mth compensation driving circuits DRC1 to DRCm. The charge compensation capacitor circuit 92 includes first to mth compensation capacitors CC1 to CCm. While an example in which m=5 is described below, it suffices that m is an integer of 2 or greater. It suffices that m is set to the same number as the number of bits of the setting data DCC [4:0].

One end of a compensation capacitor CCr is connected to the output node NVQ, and the other end is connected to a node NDRCr. The r is an integer from 1 to m=5. The compensation capacitors CC1 to CC5 have binary weighted capacitance values. More specifically, the capacitance value of the compensation capacitor CCr is $2^{(r-1)}$×CC1. The capacitance value CC1 is a capacitance value of a predetermined ratio with respect to the capacitance value C1 of the LSB of the capacitor circuit 10. The predetermined ratio is, but not limited to, 1, 1/2, 1/4 or the like, for example. For example, when CC1=C1/4 is set, charge compensation with a resolution of LSB/4 can be achieved.

A driving circuit DRCr outputs a rth compensation signal to the node NDRCr. More specifically, the processing circuit 42 outputs a rth bit DCC [r−1] of the setting data DCC [4:0] to the input node of a compensation driving circuit DRCr. The compensation driving circuit DRCr outputs the first voltage level to the node NDRCr when a bit DCC [r−1] is at the first logic level, and outputs the second voltage level to the node NDRCr when the bit DCC [r−1] is at the second logic level. For example, the first logic level is "0", the second logic level is "1", the first voltage level is a low potential side power source voltage VSH, and the second voltage level is a high potential side power source voltage VDH. The compensation driving circuit DRCr is composed of a level shifter that level-shifts the input logic level to the output voltage level of the compensation driving circuit DRCr, and a buffer circuit that buffers the output of the level shifter, for example.

Figure 9:
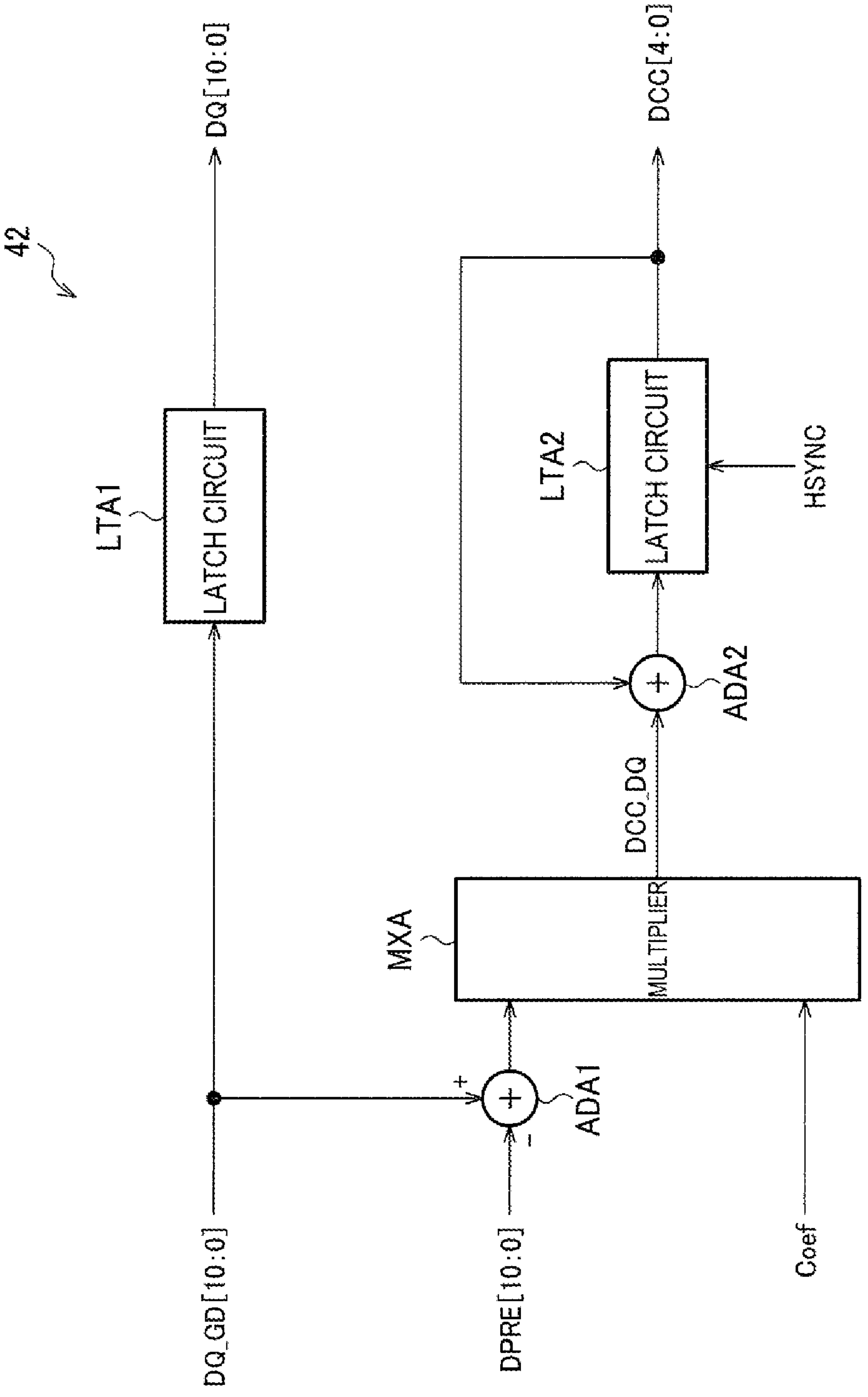
FIG. 9 illustrates an example of a first specific configuration of a processing circuit.

FIG. 9 illustrates an example of a first specific configuration of the processing circuit. The processing circuit 42 includes adders ADA1 and ADA2, a multiplier MXA and latch circuits LTA1 and LTA2. Note that the number of bits of data of which the number of bits is not described may be arbitrary. In addition, even for the data of which the number of bits is described, the number of bits may be extended in the processing circuit 42 and used for calculation.

The latch circuit LTA1 latches the gradation data DQ_GD [10:0] and outputs the latched data as the gradation data DQ [10:0] to the capacitor driving circuit 20. The adder ADA1 subtracts precharge gradation data DPRE [10:0] from the gradation data DQ [10:0]. The multiplier MXA multiplexes the output data of the adder ADA1 and data of a coefficient Coef, and outputs the result as excess/deficient gradation data DCC_DQ. The adder ADA2 adds up the excess/deficient gradation data DCC_DQ and the setting data DCC [4:0]. The latch circuit LTA2 latches the output data of the adder ADA2, and outputs the latched data as the setting data DCC [4:0] to the charge compensation circuit 90. The setting data DCC [4:0] becomes cumulative data of the excess/deficient gradation data DCC_DQ. The latch circuit LTA2 is reset by a horizontal synchronization signal HSYNC.

A specific example of calculation is described below. FIG. 10 illustrates an example of a capacitance value of a capacitor of a capacitance driving. The capacitance value corresponding to the LSB of the gradation data DQ [10:0] is set as C1=0.048828 pF. As described above, the capacitance values of C2 to C11 are binary weighted with reference to C1. When the driving circuit DR1 drives the capacitor C1 at VSH=15 V, the charge held by the capacitor C1 versus ground is C1×15 V=0.73242 pC. Likewise, the charge amounts of C2 to C11 are C2×15 V to C11×15 V.

FIG. 11 is a table illustrating an equation for calculating an excess/deficient gradation value. Here, the parasitic capacitance of one data line is 4 pF. The precharge voltage is 2.5 V. The precharge gradation value corresponding to the precharge voltage is DPRE=0.

The coefficient Coef is determined through an inspection process of an electro-optical device, a circuit simulation and the like, for example. It is assumed that in this case, the gradation value of the capacitance driving is set to 1024. The data voltage of the gradation value 1024 is 7.5 V. In this case, the excess/deficient charge amount resulting from the connection of the signal supply line and the data line is 4 PF×(7.5 V−2.5 V)=20 pC. To convert this excess/deficient charge amount to a gradation value, it is divided by the charge amount 0.73242 pC of C1 corresponding to 1LSB. As a result, an excess/deficient gradation value 27.25 at the gradation value 1024 is obtained. The coefficient Coef is the excess/deficient gradation value per gradation, and is 27.25/1024. For example, a nonvolatile memory provided outside the driver 100 stores the coefficient Coef.

In the initialization process at power-on or the like, the display controller 300 or the like reads the coefficient Coef from the nonvolatile memory and writes it in the register circuit 48 of the driver 100. The processing circuit 42 performs calculation by using the coefficient Coef stored in the register circuit 48. The processing circuit 42 determines the excess/deficient gradation value by the following Equation (1) from a gradation value DQ_GD of the gradation data DQ_GD [10:0].

$$DCC\_DQ=(DQ\_GD-DPRE)\times Coef \quad (1)$$

In the example illustrated in FIG. 11, DCC_DQ=(DQ_GD−0)×(27.25/1024) holds.

FIG. 12 illustrates an example of calculation at driving orders 1 to 4 of a horizontal scanning period. At each driving order, one data line is driven, and the driving order 1 is the first driving order of the horizontal scanning period. Here, the precharge gradation value is set as DPRE=25.

It is assumed that at the driving orders 1, 2, 3 and 4, the gradation values DQ_GD=1024, 1640, 1750, and 2048 are obtained. In this case, the excess/deficient gradation values at the driving orders 1, 2, 3 and 4 are DCC_DQ=26.5, 42.75, 45.75, and 53.75. Since the set value DCC of the charge compensation circuit 90 is the cumulative value of the excess/deficient gradation value DCC_DQ, the set values of at the driving orders 1, 2, 3 and 4 are DCC=26.5, 69.25, 115, and 168.75. The gradation value of the capacitance driving is DQ=DQ_GD.

For example, the excess/deficient gradation value DCC_DQ=26.5 at the driving order 1 corresponds to ΔV1 of FIG. 5, and the excess/deficient gradation value DCC_DQ=47.25 at the driving order 2 corresponds to ΔV2 of FIG. 5. The charge compensation circuit 90 compensates for ΔV1 at the driving order 1 and compensates for ΔV2 at the driving order 2, and therefore, ΔV1+ΔV2 is consequently compensated for at the driving order 2. In view of this, as the set value DCC of the charge compensation circuit 90, the cumulative value of the excess/deficient gradation value DCC_DQ is used.

In the above-described embodiment, the driver 100 includes the data voltage output terminal TVQ, the capacitor driving circuit 20, the capacitor circuit 10, the processing circuit 42 and the charge compensation circuit 90. The data voltage output terminal TVQ is electrically connected to the data line via the data line switch of the electro-optical panel 200. The capacitor driving circuit 20 outputs first to nth capacitor driving voltages corresponding to the gradation data to first to nth capacitor driving nodes NDR1 to NDRn. The n is an integer of 2 or greater. The capacitor circuit 10 includes the first to nth capacitors C1 to Cn provided between the output node NVQ, which is a node of the data voltage output terminal TVQ, and the first to nth capacitor driving nodes NDR1 to NDRn. The processing circuit 42 calculates an excess/deficient charge amount that is a deficient charge amount or excess charge amount of the output node NVQ when the data line switch is turned on. The charge compensation circuit 90 includes the charge compensation capacitor circuit 92. The charge compensation circuit 90 injects into the output node NVQ or discharges from the output node NVQ the compensation charge based on the excess/deficient charge amount calculated by the processing circuit 42 by using the charge compensation capacitor circuit 92.

According to this embodiment, the charge compensation circuit 90 can compensate for the excess/deficient charge through the charge redistribution by using the charge compensation capacitor circuit 92. In this manner, the voltage of the data line can be speedily made asymptotically closer to the data voltage in comparison with the case where an amplifier circuit is used to compensate for the excess/deficient charge. Alternatively, even in the case where an amplifier circuit is further additionally used, the charge amount to be compensated by the amplifier circuit can be reduced. In this manner, the power consumption or size of the amplifier circuit can be reduced.

In addition, in this embodiment, the voltage of the data line when the data line switch is off is the precharge voltage VPR. In this manner, the processing circuit 42 calculates the excess/deficient charge amount that is generated by the difference between the target voltage corresponding to the gradation data and the precharge voltage VPR when the data line switch is turned on from an off state.

The capacitance driving assumes that the charge of the output node NVQ is conserved, but as described in FIG. 5 and the like, the data line is precharged with the precharge voltage VPR before the driving, and the charge of the output node NVQ is not conserved when the output node NVQ charged with the data voltage and data line are connected. According to this embodiment, the excess/deficient charge amount that is generated by the difference between the precharge voltage VPR and the target voltage corresponding to the gradation data DQ [10:0] is calculated, and thus the output node NVQ can be brought closer to the charge conservation state, and, the voltage of the data line can be brought closer to the target voltage.

Note that the target voltage is the data voltage represented by the gradation data, and is the original voltage that should be output to the data line.

In addition, in this embodiment, the gradation value corresponding to the target voltage is set as DQ_GD, the gradation value corresponding to the precharge voltage VPR is set as DPRE, the coefficient representing the ratio of the excess/deficient charge amount with respect to the difference between the target voltage and the precharge voltage VPR is set as Coef, and the excess/deficient gradation value that compensates for the excess/deficient charge amount is set as DCC_DQ. In this case, the processing circuit 42 calculates the excess/deficient gradation value by DCC_DQ=(DQ_GD-DPRE)×Coef. The charge compensation circuit 90 injects into the output node NVQ or discharges from the output node NVQ the compensation charge on the basis of the excess/deficient gradation value DCC_DQ.

According to this embodiment, the excess/deficient gradation value DCC_DQ that is the gradation value corresponding to the excess/deficient charge amount is obtained through the above-mentioned calculation. The gradation value corresponding to the charge amount is a gradation value when the charge amount of the first capacitor C1 of the capacitor circuit 10 is set as one gradation. By using the excess/deficient gradation value DCC_DQ, the excess/deficient charge amount can be handled with reference to the charge amount corresponding to one gradation. For example, the capacitance value of the capacitor of the charge compensation capacitor circuit 92 may be doubled, halved or the like with reference to the capacitance value of the first capacitor C1 of the capacitor circuit 10, for example. In this manner, the capacitor can compensate for the excess/deficient charge amount corresponding to two gradations or ½ gradation.

In addition, in this embodiment, the charge compensation capacitor circuit 92 includes the first to mth compensation capacitors CC1 to CCm of which one end is connected to the output node NVQ. The charge compensation circuit 90 includes the first to mth compensation driving circuits DRC1 to DRCm that output first to mth compensation signals based on the excess/deficient charge amount to the other ends of the first to mth compensation capacitors CC1 to CCm.

According to this embodiment, the other ends of the first to mth compensation capacitors CC1 to CCm are driven by the first to mth compensation signals based on the excess/deficient charge amount. In this manner, the compensation charge based on the excess/deficient charge amount is injected from the first to mth compensation capacitors CC1 to CCm to the output node NVQ or discharged from the output node NVQ.

In addition, in this embodiment, the processing circuit 42 outputs the set value DCC of the charge compensation circuit 90 on the basis of the cumulative value of the excess/deficient charge amount for each data line. The first to mth compensation driving circuits DRC1 to DRCm output the first to mth compensation signals corresponding to the set value DCC. When driven by the first to mth compensation signals, the first to mth compensation capacitors CC1 to CCm inject into the output node NVQ or discharge from the output node NVQ the compensation charge corresponding to the excess/deficient charge amount.

By performing the charge compensation when a certain data line is driven, the output node NVQ is maintained in the charge conservation state, and the charge compensation is further performed with reference to that charge state when the next data line is driven. In this manner, the charge compensation is accumulated. In this embodiment, the set value DCC of the charge compensation circuit 90 is output on the basis of the cumulative value of the excess/deficient charge amount for each data line, and thus the charge compensation is accumulated.

3. Second Embodiment

Figure 13:
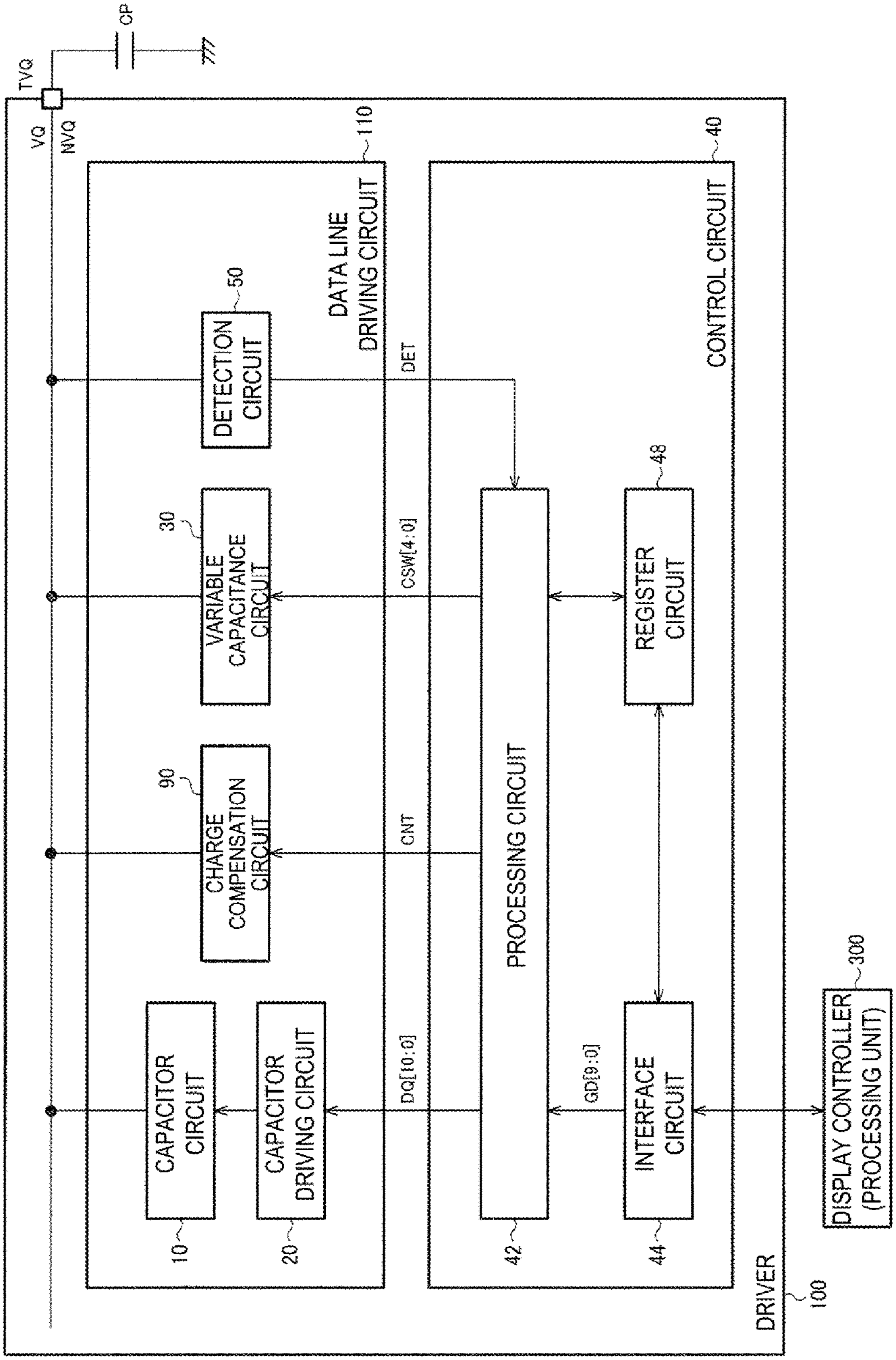
FIG. 13 illustrates an example of a second specific configuration of a driver.

FIG. 13 illustrates an example of a second specific configuration of a driver. In this exemplary configuration, the processing circuit 42 outputs a control signal CNT that controls the compensation operation of the charge compensation circuit 90 to the charge compensation circuit 90 on the basis of the excess/deficient gradation value DCC_DQ. Note that the components described above will be denoted with the same reference signs, and the description thereof will be omitted as necessary.

In the second embodiment, the charge compensation circuit 90 injects into the output node NVQ or discharges from the output node NVQ the compensation charge with the same charge amount as the excess/deficient charge amount during the driving of each data line as in the first embodiment. It should be noted that it differs in the configuration of the charge compensation circuit 90.

Figure 14:
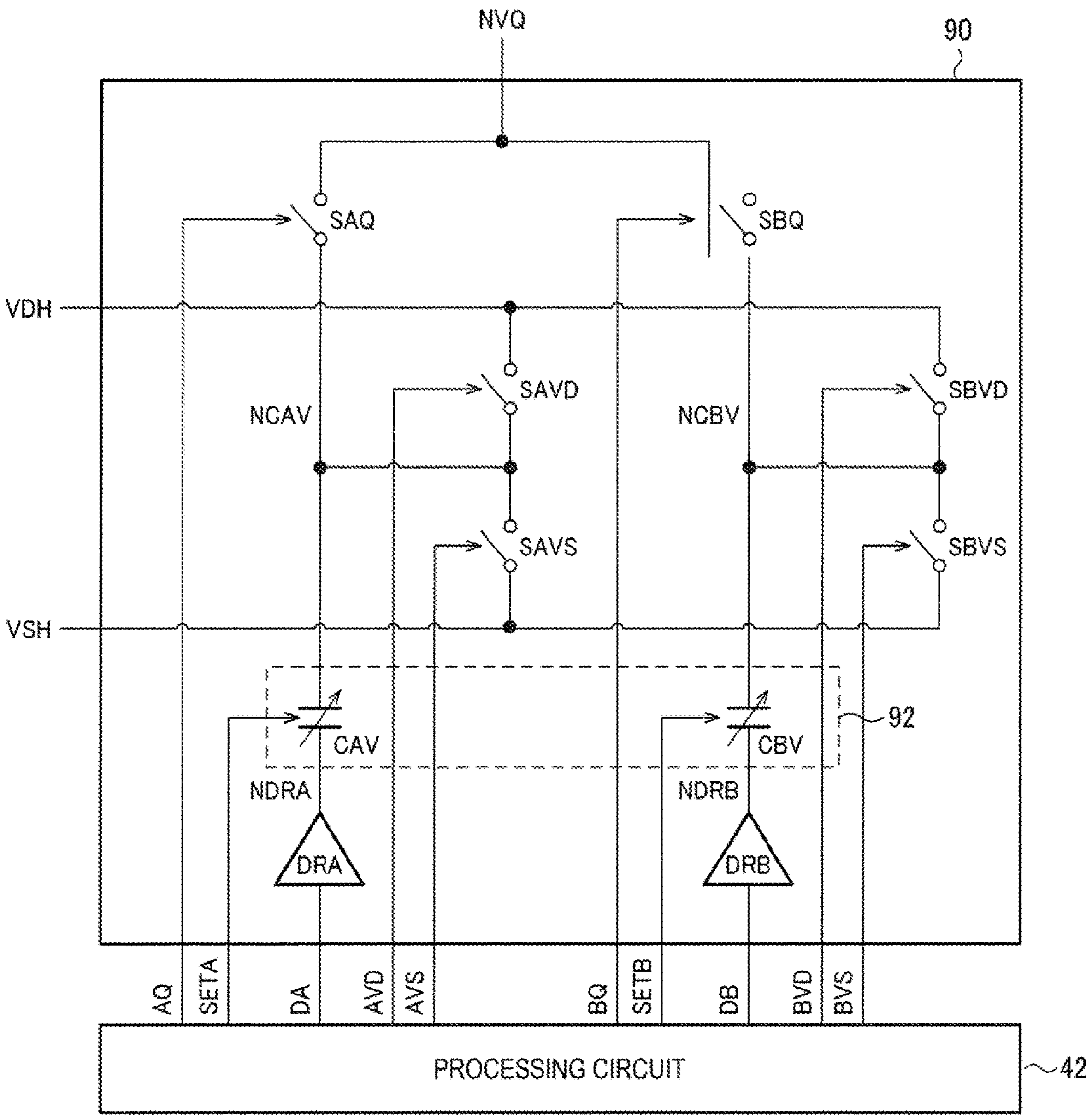
FIG. 14 illustrates an example of a second specific configuration of the charge compensation circuit.

FIG. 14 illustrates an example of a second specific configuration of a charge compensation circuit. The charge compensation circuit 90 includes the charge compensation capacitor circuit 92, a first compensation driving circuit DRA, a first switch SAQ, a second switch SAVD, a third switch SAVS, a second compensation driving circuit DRB, a fourth switch SBQ, a fifth switch SBVD, and a sixth switch SBVS. The charge compensation capacitor circuit 92 includes a first compensation capacitor CAV and a second compensation capacitor CBV.

One end of the switch SAQ is connected to the output node NVQ, and the other end is connected to a node NCAV. One end of the switch SAVD is connected to a high potential side power source node NVDH to which the high potential side power source voltage VDH is supplied, and the other end is connected to the node NCAV. One end of the switch SAVS is connected to a low potential side power source node NVSH to which the low potential side power source voltage VSH is supplied, and the other end is connected to the node NCAV. One end of the compensation capacitor CAV is connected to the node NCAV, and the other end is connected to a node NDRA.

One end of the switch SBQ is connected to the output node NVQ, and the other end is connected to a node NCBV. One end of the switch SBVD is connected to the high potential side power source node NVDH to which the high potential side power source voltage VDH is supplied, and the other end is connected to the node NCBV. One end of the switch SBVS is connected to the low potential side power source node NVSH to which the low potential side power source voltage VSH is supplied, and the other end is connected to the node NCBV. One end of the compensation capacitor CBV is connected to the node NCBV, and the other end is connected to node NDRB.

The processing circuit 42 outputs, as the control signal CNT, a control signal AQ for controlling the switch SAQ on or off, a control signal AVD for controlling the switch SAVD on or off, a control signal AVS for controlling the switch SAVS on or off, a control signal DA of the compensation driving circuit DRA, and setting data SETA for setting the capacitance value of the compensation capacitor CAV. In addition, the processing circuit 42 outputs, as the control signal CNT, a control signal BQ for controlling the switch SBQ on or off, the control signal BVD for controlling the switch SBVD on or off, the control signal BVS for controlling the switch SBVS on or off, the control signal DB of the compensation driving circuit DRB, and setting data SETB for setting the capacitance value of the compensation capacitor CBV.

Each of the switches SAQ, SAVD, SAVS, SBQ, SBVD, and SBVS is an analog switch, and is an N-type transistor, a P-type transistor, or a transfer gate of them connected in parallel, for example.

The compensation capacitor CAV is composed of a compensating variable capacitance circuit of which the capacitance value is variable. It is assumed that the number of bits of the setting data SETA is 9. In this case, the compensating variable capacitance circuit includes first to ninth capacitors and first to ninth switches. One end of the first switch is connected to the node NCAV, and the other end is connected to one end of the first capacitor. The other end of the first capacitor is connected to the node NDRA. Likewise, one ends of second to ninth switches are connected to the node NCAV, and the other ends are connected to one ends of second to ninth capacitors. The other ends of the second to ninth capacitors are connected to the node NDRA. The capacitance values of the second to ninth capacitors are binary weighted with reference to the capacitance value of the first capacitor. The first switch is controlled on or off by the first bit SETA [0] of the setting data. Likewise, the second to ninth switches are controlled on or off by the second bit SETA [1] to ninth bit SETA [8] of the setting data. The compensation capacitor CBV has a similar configuration.

The compensation driving circuit DRA outputs the first voltage level to the node NDRA when the control signal DA is at the first logic level, and outputs the second voltage level to the node NDRA when the control signal DA is at the second logic level. For example, the first logic level is “0”, the second logic level is “1”, the first voltage level is a low potential side power source voltage VSH, and the second voltage level is a high potential side power source voltage VDH. The compensation driving circuit DRA is composed of a level shifter that level-shifts the input logic level to the output voltage level of the compensation driving circuit DRA, and a buffer circuit that buffers the output of the level shifter, for example. The compensation driving circuit DRB also has a similar configuration.

Figure 15:
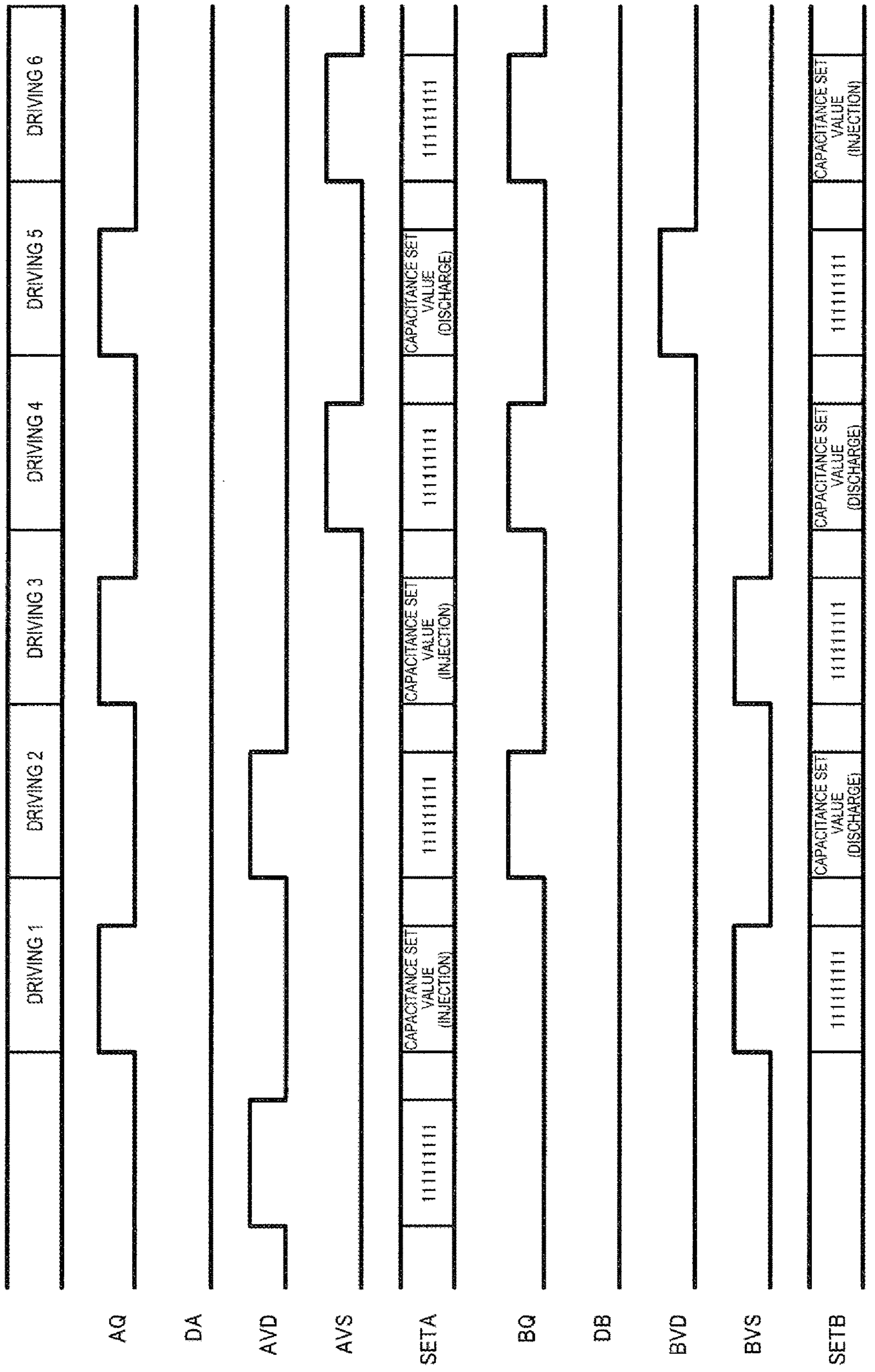
FIG. 15 illustrates an example of a signal waveform of a control signal that is output by a processing circuit to a charge compensation circuit in a second embodiment.

FIG. 15 illustrates an example of a signal waveform of a control signal that is output to the charge compensation circuit by the processing circuit in the second embodiment. The control signal of the switch indicates on when it is at the high level, and indicates off when it is at the low level.

The signals DA and DB are at the low level, and the compensation driving circuits DRA and DRB output VSH=0 V.

Before the driving order 1, the capacitance value of the compensation capacitor CAV is set to the maximum value, and the switch SAVD is turned on. As a result, the first to ninth capacitors of the compensation capacitor CAV are charged with VDH=15 V. Thereafter, the switch SAVD is turned off.

At the driving order 1, the capacitance value of the compensation capacitor CAV is set by the setting of the capacitance set value SETA at the time of injection, and the switch SAQ is turned on. As a result, the compensation charge corresponding to the capacitance set value SETA at the time of injection is injected to the output node NVQ from the compensation capacitor CAV.

In addition, at the driving order 1, the capacitance value of the compensation capacitor CBV is set to the maximum value, and the switch SBVS is turned on. In this manner, the first to ninth capacitors of the compensation capacitor CBV are charged with VSH=0 V. Thereafter, the switch SBVS is turned off.

At the driving order 2, the capacitance value of the compensation capacitor CBV is set by the setting of a capacitance set value SETB at the time of discharge, and the switch SBQ is turned on. In this manner, the compensation charge corresponding to the capacitance set value SETB at the time of the discharge is injected to the output node NVQ from the compensation capacitor CBV.

In addition, at the driving order 2, the capacitance value of the compensation capacitor CAV is set to the maximum value, and the switch SAVD is turned on.

At subsequent driving orders, operations similar to those of the above-mentioned orders are repeated, the charge compensation is performed by the compensation capacitor CAV at odd-numbered driving orders, and the charge compensation is performed by the compensation capacitor CBV at the even-numbered driving orders. The charge discharge is performed by the compensation capacitor CAV at the driving order 5, but in this case, the switch SAVS is turned on at the driving order 4. In addition, the charge injection is performed by the compensation capacitor CBV at the driving order 6, but in this case, the switch SBVD is turned on at the driving order 5.

Note that at each of the driving orders 1, 3 and 5, either of charge injection or charge discharge may be performed by the compensation capacitor CAV. At each of the driving orders 2, 4 and 6, either of charge injection or charge discharge may be performed by the compensation capacitor CBV.

Figure 16:
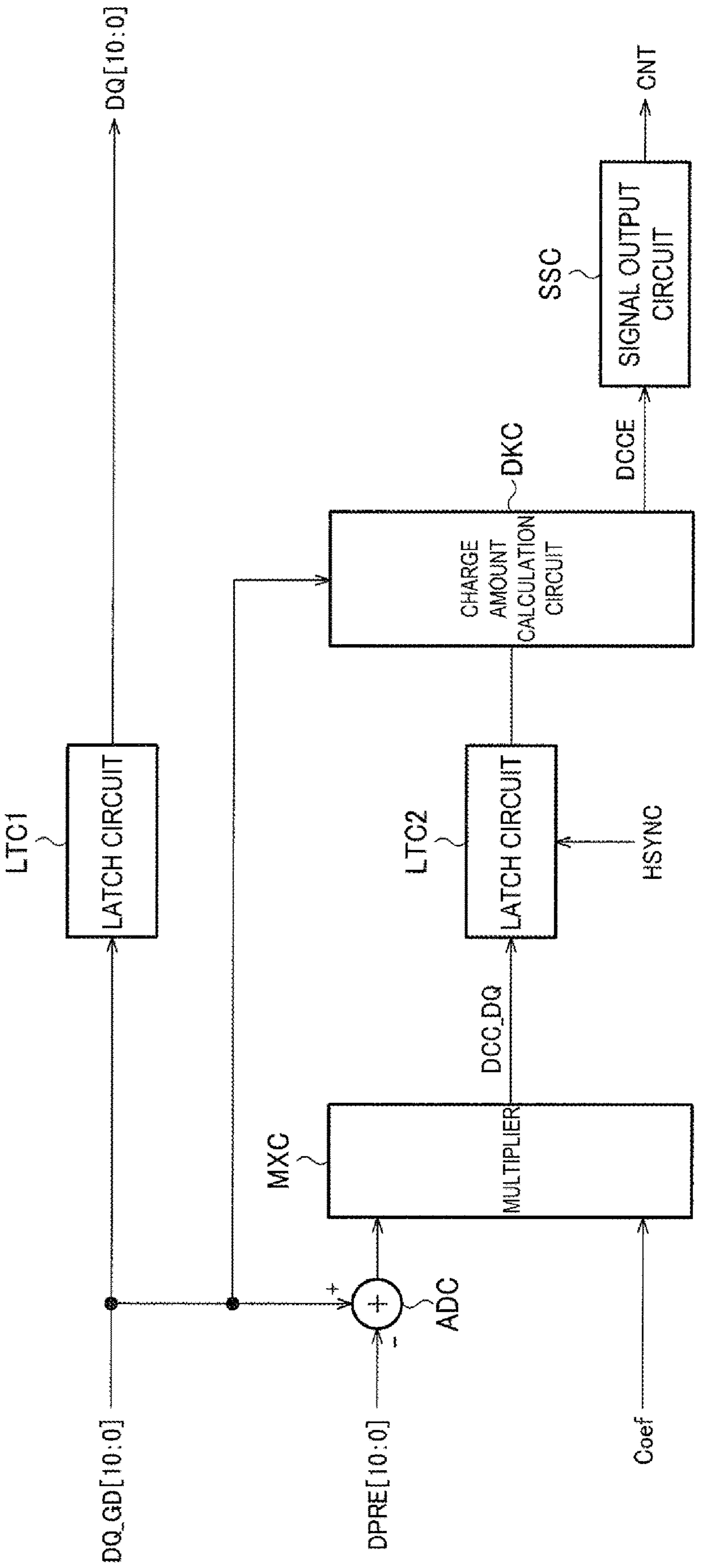
FIG. 16 illustrates an example of a second specific configuration of a processing circuit.

FIG. 16 illustrates an example of a second specific configuration of the processing circuit 42. The processing circuit 42 includes an adder ADC, a multiplier MXC, latch circuits LTC1 and LTC2, a charge amount calculation circuit DKC, and a signal output circuit SSC. The calculation of the gradation data DQ [10:0] and the calculation of the excess/deficient gradation data DCC_DQ are similar to those of FIG. 9.

The latch circuit LTC2 latches the excess/deficient gradation data DCC_DQ that is output data of the multiplier MXC and outputs it to the charge amount calculation circuit DKC. The charge amount calculation circuit DKC calculates capacitance setting data DCCE on the basis of the excess/deficient gradation data DCC_DQ and the gradation data DQ_GD [10:0]. The signal output circuit SSC outputs the control signal CNT to the charge compensation circuit 90 on the basis of the capacitance setting data DCCE. More specifically, the signal output circuit SSC outputs a control signal of the switch in accordance with whether it is charge injection or charge discharge, and outputs the capacitance setting data DCCE as the setting data SETA of the compensation capacitor CAV or the setting data SETB of the compensation capacitor CBV.

A specific example of calculation is described below.

Figure 17:
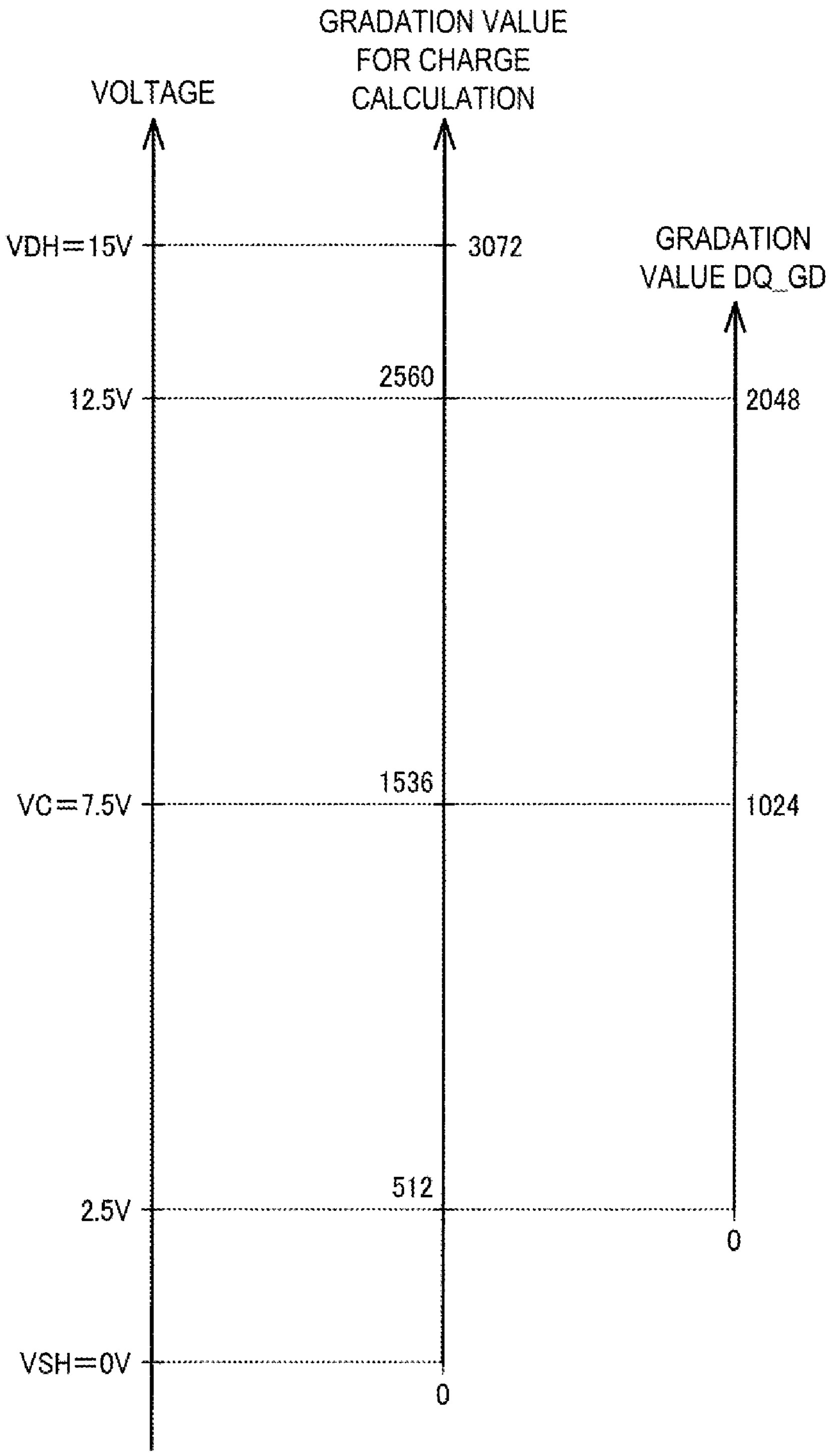
FIG. 17 is a diagram for describing a gradation value for calculating a compensation charge amount.

As illustrated in FIG. 17, the charge amount calculation circuit DKC uses a gradation value for calculating the compensation charge amount. More specifically, displaying gradation values 0 to 2048 corresponding to 2.5 V to 12.5 V are extended to calculating gradation values 0 to 3072 corresponding to VSH=0 V to VDH=15 V. Specifically, by adding 512 to the displaying gradation values 0 to 2048, they are converted to calculating gradation values 512 to 2560. Further, the lower limit of the calculating gradation value is extended to 0 corresponding to VSH=0 V, and the upper limit is extended to 3072 corresponding to VDH=15 V.

FIG. 18 is a table illustrating an equation for calculating a capacitance set value. The method of calculating the excess/deficient gradation value DCC_DQ is the same as that of the first embodiment.

When DCC_DQ>0 holds, the charge is deficient, and DCC_DQ indicates a deficient gradation value. In this case, the charge amount calculation circuit DKC calculates the capacitance set value DCCE at the time of charge injection by the following Equation (2).

$$DCCE=DCC\_DQ/(3072-(DQ\_GD+512))\times 3072 \quad (2)$$

When DCC_DQ<0 holds, the charge is excess, and DCC_DQ indicates an excess gradation value. In this case, the charge amount calculation circuit DKC calculates the capacitance set value DCCE at the time of charge discharge by the following Equation (3).

$$DCCE=-DCC\_DQ/(DQ\_GD+512)\times 3072 \quad (3)$$

In the Equations (2) and (3), 512 is a calculating gradation value corresponding to the gradation value DQ_GD=0. 3072 is a calculating gradation value corresponding to the high potential side power source voltage VDH.

FIG. 19 illustrates an example of calculation at driving orders 1 to 4 of a horizontal scanning period. Here, the precharge gradation value is set as DPRE=512 in the displaying gradation value. In addition, the coefficient for calculating the excess/deficient gradation value DCC_DQ is set as Coef=27.25 as in the first embodiment.

It is assumed that at the driving orders 1, 2, 3 and 4, the gradation values DQ_GD=2048, 0, 1024 and 0 are obtained. In this case, the excess/deficient gradation values at the driving orders 1, 2, 3 and 4 are DCC_DQ=40.75, −13.75, 13.5, and −13.75. The DCC_DQ is a deficient gradation value when DCC_DQ>0 holds, and the DCC_DQ is an excess gradation value when DCC_DQ<0 holds. The capacitance set value DCCE is calculated by the Equation (2) or (3). The gradation value of the capacitance driving is DQ=DQ_GD.

It is assumed that the capacitance value of the first capacitor of the compensation capacitors CAV and CBV is ½ of the capacitance value of the capacitor C1 of the capacitor circuit 10, for example. When the capacitance set value DCCE is represented by the capacitance setting data DCCE [8:0] of 9 bits, the DCCE [0] of its LSB corresponds to ½ gradation. For example, at the driving order 2, the capacitance set value DCCE=82.5 is obtained at the time of charge discharge, and therefore DCCE [8:0]=010100101 is obtained. With this DCCE [8:0], the capacitance value of the compensation capacitor CBV is set, and the compensation charge corresponding to DCC_DQ=−13.75 that is an excess gradation value is discharged from the output node NVQ.

In the above-described embodiment, the charge compensation capacitor circuit 92 includes the first compensation capacitor CAV. The charge compensation circuit 90 includes the first switch SAQ, the second switch SAVD and the third switch SAVS. One end of the first switch SAQ is connected to the output node NVQ, and the other end is connected to the one end of the first compensation capacitor CAV. The second switch SAVD is provided between the high potential side power source node NVDH and the other end of the first switch SAQ. The third switch SAVS is provided between the low potential side power source node NVSH and the other end of the first switch SAQ.

According to this embodiment, the one end of the first compensation capacitor CAV can be charged with the high potential side power source voltage VDH when the second switch SAVD turns on, and the compensation charge can be injected to the output node NVQ from the one end of the first compensation capacitor CAV when the first switch SAQ turns on. The one end of the first compensation capacitor CAV can be charged with the low potential side power source voltage VSH when the third switch turns on, and the compensation charge can be discharged to one end of the first compensation capacitor CAV from the output node NVQ when the first switch SAQ turns on.

In addition, in this embodiment, in the preparation period before the data line is driven, the first switch SAQ is off, and the second switch SAVD or the third switch SAVS is on. In the compensation period including the period in which the data line is driven, the first switch SAQ is on, and the second switch SAVD and the third switch SAVS are off.

According to this embodiment, in the preparation period, the one end of the first compensation capacitor CAV can be charged with the high potential side power source voltage VDH or the low potential side power source voltage VSH. Further, in the compensation period, the compensation charge can be injected to the output node NVQ or the compensation charge can be discharged from the output node NVQ.

Note that in the example of the compensation capacitor CAV in the example of FIG. 15, the preparation period corresponds to the period in which the second switch SAVD or the third switch SAVS is on before the driving order 1 and at the driving orders 2, 4 and 6. In addition, the compensation period corresponds to the period in which the first switch SAQ is on at the driving orders 1, 3 and 5.

In addition, in this embodiment, the first compensation capacitor CAV is the compensating variable capacitance circuit of which the capacitance value is variable. The processing circuit 42 sets the capacitance value of the compensating variable capacitance circuit on the basis of the excess/deficient charge amount.

According to this embodiment, the capacitance value of the compensating variable capacitance circuit is set on the basis of the excess/deficient charge amount, and thus in the compensation period, the compensation charge corresponding to the excess/deficient charge amount is injected to the output node NVQ from the first compensation capacitor CAV or discharged to the first compensation capacitor CAV from the output node NVQ.

In addition, in this embodiment, the charge compensation capacitor circuit 92 includes the second compensation capacitor CBV. The charge compensation circuit 90 includes the fourth switch SBQ, the fifth switch SBVD and the sixth switch SBVS. One end of the fourth switch SBQ is connected to the output node NVQ, and the other end is connected to one end of the second compensation capacitor CBV. The fifth switch SBVD is provided between the high potential side power source node NVDH and the other end of the fourth switch SBQ. The sixth switch SBVS is provided between the low potential side power source node NVSH and the other end of the fourth switch SBQ.

According to this embodiment, the charge compensation can be alternately performed with the first compensation capacitor CAV and the second compensation capacitor CBV. Specifically, the compensation period of the charge compensation with the first compensation capacitor CAV can be used as the preparation period for the charge compensation with the second compensation capacitor CBV, and the preparation period for the charge compensation with the first compensation capacitor CAV can be used as the compensation period of the charge compensation with the second compensation capacitor CBV. In this manner, increase in the speed of the driving due to increase in the number of pixels or frame rate can be easily handled.

4. Third Embodiment

In the third embodiment, the excess/deficient gradation value is added to the gradation value to the capacitance driving using the capacitor circuit 10 and the capacitor driving circuit 20 to compensate for the excess/deficient charge. Through this compensation, shift of the gradation value of the capacitance driving with respect to the original gradation value is accumulated, and the capacitance driving cannot compensate for the excess/deficient charge. In view of this, the charge compensation circuit 90 supplies a compensation charge to reduce the accumulation of the shift.

The example of the specific configuration of the driver 100 in the third embodiment is the same as that of FIG. 13 of the second embodiment. It should be noted that it differs in the content of the control signal CNT.

Figure 20:
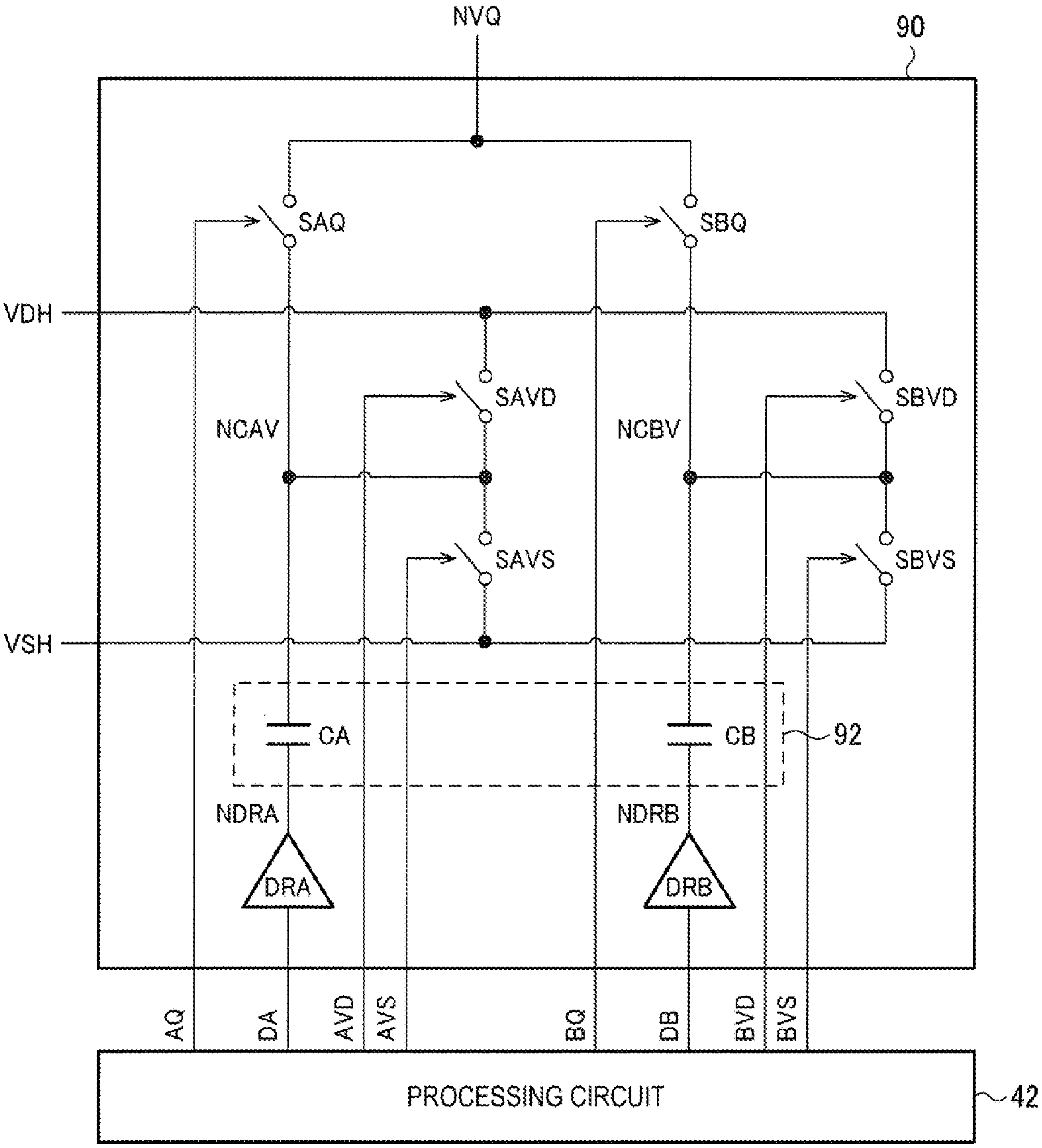
FIG. 20 illustrates an example of a second specific configuration of the charge compensation circuit.

FIG. 20 illustrates an example of a second specific configuration of a charge compensation circuit. In this exemplary configuration, the compensation capacitors CAV and CBV are capacitors with fixed capacitance value. The processing circuit 42 outputs, as the control signal CNT, the control signals AQ, AVD, AVS, DA, BQ, BVD, BVS and DB.

Figure 21:
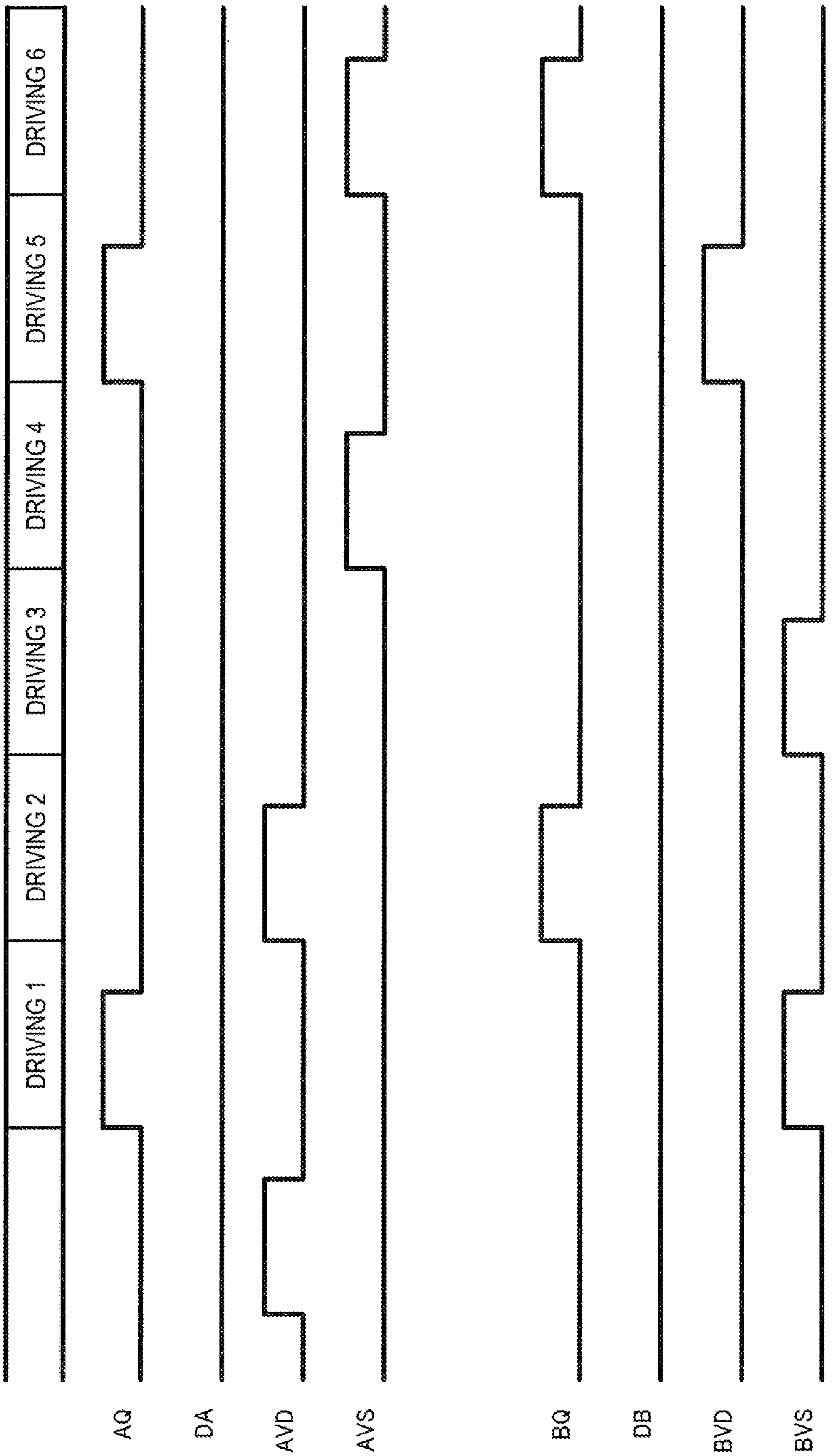
FIG. 21 illustrates an example of a first signal waveform of a control signal that is output by a processing circuit to a charge compensation circuit in a third embodiment.

FIG. 21 illustrates an example of a first signal waveform of a control signal that is output to a charge compensation circuit by a processing circuit in the third embodiment. The control signals DA and DB of the compensation driving circuits DRA and DRB and the control signals AVD, AVS, BVD and BVS of the switches SAVD, SAVS, SBVD and SBVS are the same as those of FIG. 15 of the second embodiment. In the odd-numbered driving orders, the switch SAQ turns on when the charge compensation with the compensation capacitor CAV is performed, and the switch SAQ remains off when the charge compensation with the compensation capacitor CAV is not performed. FIG. 21 illustrates an example in which charge compensation is performed at the driving orders 1 and 5 and the charge compensation is not performed at the driving order 3. In even-numbered driving orders, the switch SBQ turns on when the charge compensation with the compensation capacitor CBV is performed, and the switch SBQ remains off when the charge compensation with the compensation capacitor CBV is not performed. FIG. 21 illustrates an example in which charge compensation is performed at the driving orders 2 and 6, and the charge compensation is not performed at the driving order 4.

Note that at each of the driving orders 1, 3 and 5, either of charge injection or charge discharge may be or may not be performed by the compensation capacitor CAV. At each of the driving orders 2, 4 and 6, either of charge injection or charge discharge may be or may not be performed by the compensation capacitor CBV.

Figure 22:
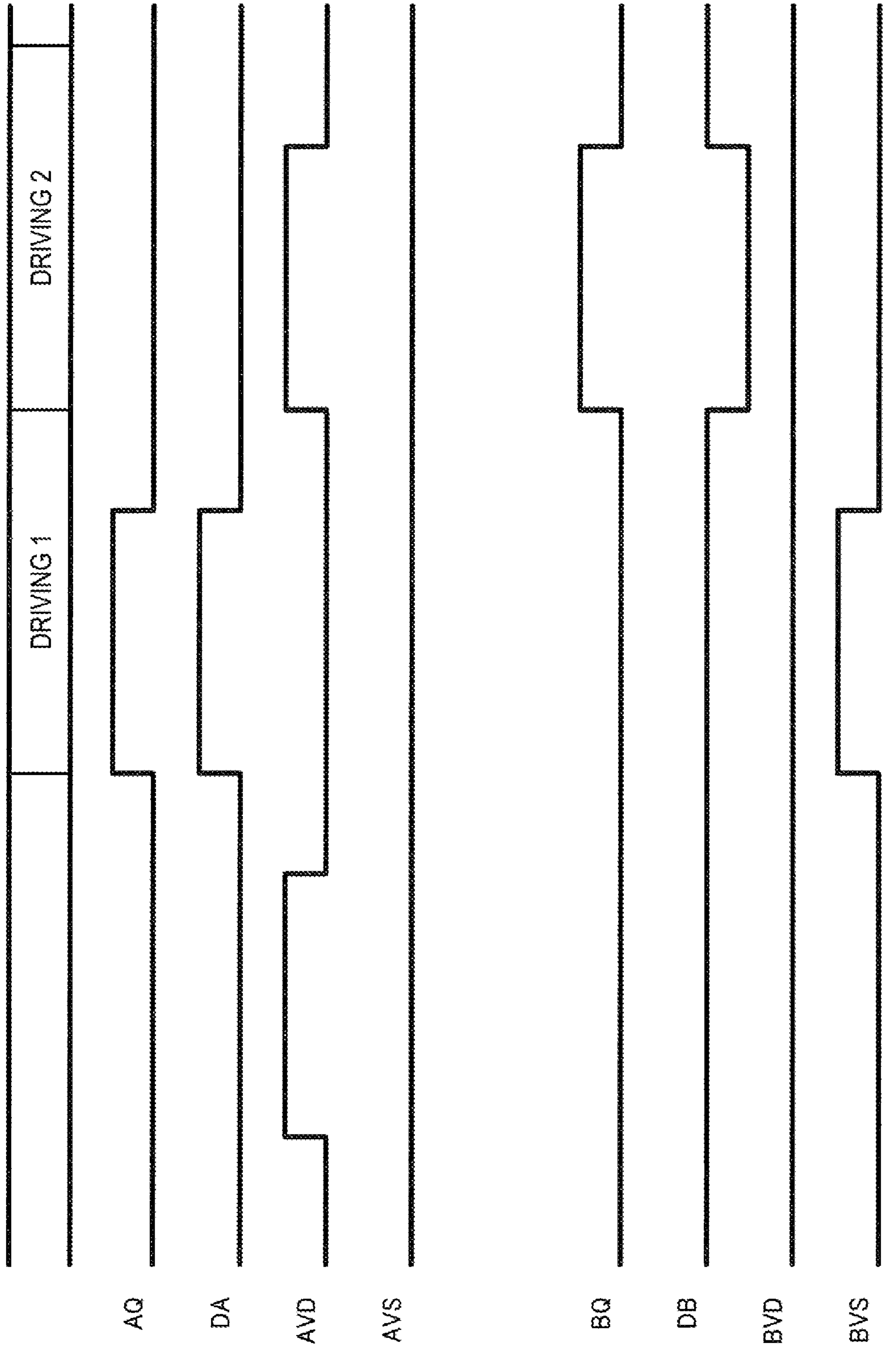
FIG. 22 illustrates an example of a second signal waveform of a control signal output by the processing circuit to the charge compensation circuit in the third embodiment.

FIG. 22 is an example of a second signal waveform of a control signal output by a processing circuit to a charge compensation circuit in the third embodiment.

In this exemplary waveform, the compensation driving circuits DRA and DRB drive the other ends of the compensation capacitors CAV and CBV. Specifically, at the driving order 1, when the switch SAQ turns on, the control signal DA becomes the high level from the low level. As a result, the output of the compensation driving circuit DRA becomes VDH=15 V from VSH=0 V, and the other end of the compensation capacitor CAV is driven. At the driving order 2, when the switch SBQ turns on, the control signal DB becomes the low level from the high level. As a result, the output of the compensation driving circuit DRB becomes VSH=0 V from VDH=15 V, and the other end of the compensation capacitor CBV is driven.

When the other ends of the compensation capacitors CAV and CBV are driven, the charge amount of the compensation charge can be increased, or the capacitance values of the compensation capacitors CAV and CBV can be reduced while maintaining the charge amount of the compensation charge.

Figure 23:
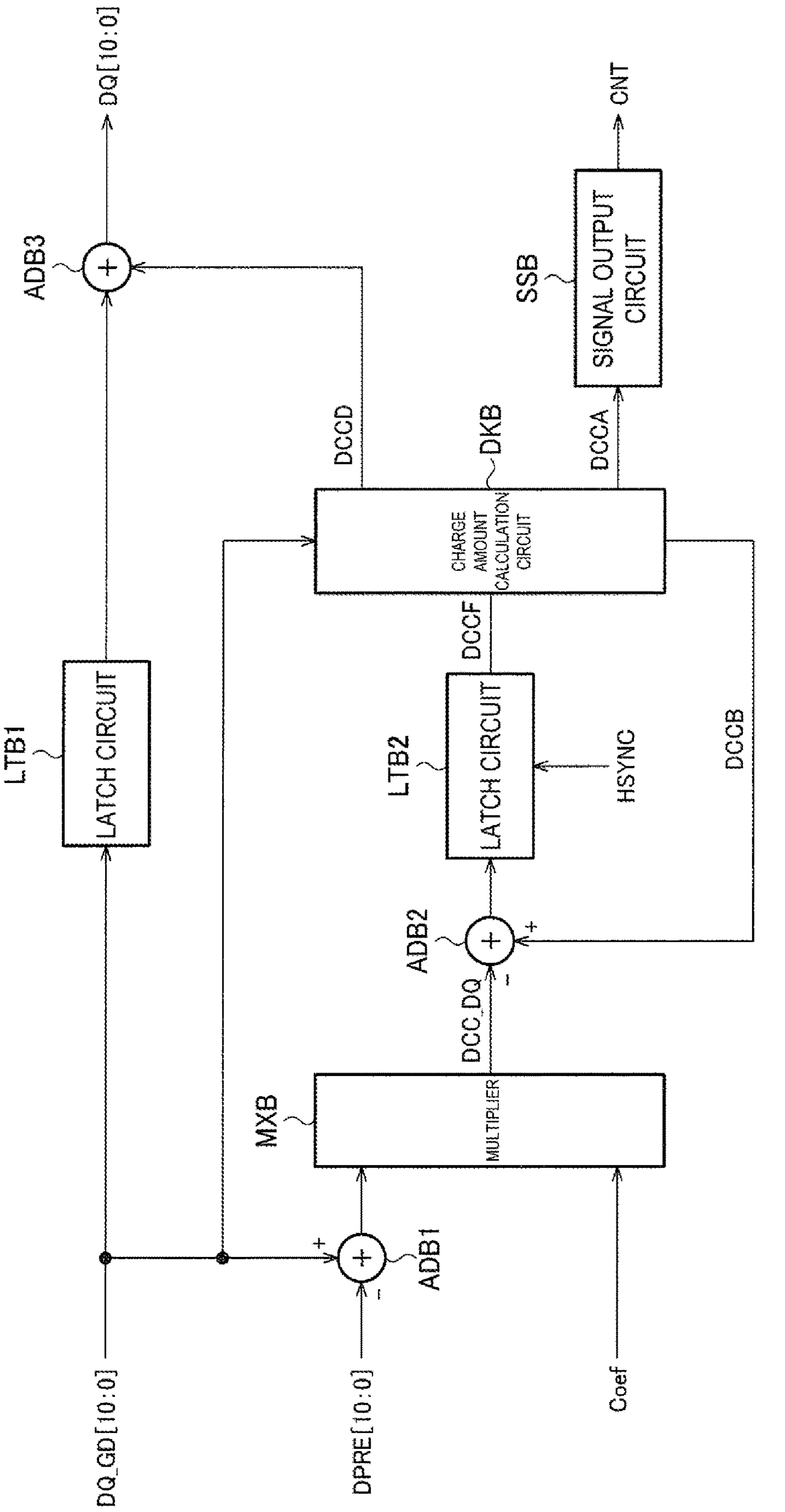
FIG. 23 illustrates an example of a third specific configuration of a processing circuit.

FIG. 23 illustrates an example of a third specific configuration of a processing circuit. The processing circuit 42 includes adders ADB1, ADB2 and ADB3, a multiplier MXB, latch circuits LTB1 and LTB2, a charge amount calculation circuit DKB, and a signal output circuit SSB. The calculation of the excess/deficient gradation data DCC_DQ is the same as that of FIG. 9.

The adder ADB2 subtracts the excess/deficient gradation data DCC_DQ from cumulative data DCCB after charge compensation output by the charge amount calculation circuit DKB. The latch circuit LTB2 latches the output data of the adder ADB2, and outputs the latched data to the charge amount calculation circuit DKB as the cumulative data DCCF before charge compensation.

The charge amount calculation circuit DKB calculates a compensation charge amount DCCA, excess/deficient gradation data DCCD to capacitance driving and the cumulative data DCCB after charge compensation on the basis of the cumulative data DCCF before charge compensation and the gradation data DQ_GD [10:0]. Deficiency of charge is indicated when the cumulative value DCCF<0 holds, and excess of charge is indicated when the cumulative value DCCF>0 holds. The compensation charge amount DCCA is a charge injection amount and a charge discharge amount as described in FIG. 22. The charge amount calculation circuit DKB calculates the charge injection amount by the following Equation (4) described later with FIG. 24 when −DCCF≥the threshold value of the charge injection amount holds, and sets the charge injection amount=0 when −DCCF<the threshold value of the charge injection amount holds. The charge amount calculation circuit DKB calculates the charge discharge amount by the following Equation (5) described later with FIG. 24 when DCCF≥the threshold value of the charge discharge amount holds, and sets the charge discharge amount=0 when DCCF<the threshold value of the charge discharge amount holds. The cumulative value before the charge compensation is DCCB=DCCF+charge injection amount−charge discharge amount. The excess/deficient gradation value to the capacitance driving is DCCD=−INT (DCCB). INT ( ) is a function that returns an integer value of an argument.

The signal output circuit SSB outputs the control signal CNT to the charge compensation circuit 90 on the basis of the compensation charge amount DCCA. More specifically, the compensation charge amount DCCA is the charge injection amount and the charge discharge amount. The signal output circuit SSB outputs a switch control signal for instructing the charge injection to the charge compensation circuit 90 when the charge injection amount is equal to or greater than the threshold value of the charge injection amount, and outputs the switch control signal for instructing the charge discharge to the charge compensation circuit 90 when the charge discharge amount is equal to or greater than the threshold value of the charge discharge amount. The adder ADB3 adds up the gradation data DQ_GD [10:0] latched by the latch circuit LTB1 and the excess/deficient gradation data DCCD from the charge amount calculation circuit DKB, and outputs the result to the capacitor driving circuit 20 as the gradation data DQ [10:0].

A specific example of calculation is described below.

FIG. 24 is a table illustrating an equation for calculating a charge injection amount and a charge discharge amount. Here, an example in which the charge injection is performed by the compensation capacitor CAV and the charge discharge is performed by the compensation capacitor CBV is described. Gradation data for charge calculation is used as in FIG. 17 of the second embodiment.

The charge amount calculation circuit DKB calculates the compensation charge amount DCCA that is the charge injection amount by the following Equation (4). The charge amount calculation circuit DKB calculates the compensation charge amount DCCA that is the charge discharge amount by the following Equation (5).

$$DCCA=(3072-(DQ\_GD+512))\times(312/3072) \quad (4)$$

$$DCCA=(DQ\_GD+512)\times(80/3072) \quad (5)$$

In the Equation (4), 312 of the coefficient (312/3072) is a ratio of the capacitance value of the compensation capacitor CAV with respect to the capacitance value of the capacitor C1 of the capacitance driving. In the Equation (5), 80 of the coefficient (80/3072) is a ratio of the capacitance value of the compensation capacitor CBV with respect to the capacitance value of the capacitor C1 of the capacitance driving. In the Equations (4) and (5), 512 is a calculating gradation value corresponding to the gradation value DQ_GD=0. 3072 is a calculating gradation value corresponding to the high potential side power source voltage VDH.

FIG. 25 illustrates an example of calculation at driving orders 1 to 4 of a horizontal scanning period. Here, the precharge gradation value is set as DPRE=512 in the displaying gradation value. In addition, the coefficient for calculating the excess/deficient gradation value DCC_DQ is set as Coef=27.25 as in the first embodiment.

The threshold value of the charge injection amount is set as 52, and the threshold value of the charge discharge amount is set as 13.33. For example, the display controller 300 or the like writes the threshold values in the register circuit 48 of the driver 100, and the processing circuit 42 performs calculation by using the threshold value read from the register circuit 48. The threshold value of the charge injection amount is set to a value around the minimum value of the charge injection amount in the range of the gradation value DQ_GD=0 to 2047, for example. When DQ_GD=2047 is obtained, the charge injection amount has a minimum value 52. Here, this minimum value 52 is set as the threshold value. The threshold value of the charge discharge amount is set to a value around the minimum value of the charge injection amount in the range of the gradation value DQ_GD=0 to 2047, for example. When DQ_GD=0 is obtained, the charge discharge amount has a minimum value 13.33. Here, this minimum value 13.33 is set as the threshold value.

It is assumed that at the driving order 1, the gradation value DQ_GD=512 is obtained. In this case, the excess/deficient gradation value is DCC_DQ=0, and the cumulative value before the charge compensation is DCCF=0. Since −DCCF<52 and DCCF<13.33 hold, the compensation charge amount DCCA is the charge injection amount=0 and the charge discharge amount=0. The cumulative value after the charge compensation is DCCB=0+0−0=0. The excess/deficient gradation value to the capacitance driving is DCCD=−INT (0)=0, and the gradation value to the capacitance driving is DQ=512+0=512.

It is assumed that at the driving order 2, the gradation value DQ_GD=256 is obtained. In this case, the excess/deficient gradation value is DCC_DQ=−7, and the cumulative value before the charge compensation is DCCF=0-7=7. Since-DCCF<52 and DCCF<13.33 hold, the compensation charge amount DCCA is the charge injection amount=0 and the charge discharge amount=0. The cumulative value after the charge compensation is DCCB=7+0−0=7. The excess/deficient gradation value to the capacitance driving is DCCD=−INT (7)=−7, and the gradation value to the capacitance driving is DQ=256+(−7)=249.

It is assumed that at the driving order 3, the gradation value DQ_GD=128 is obtained. In this case, the excess/deficient gradation value is DCC_DQ=−10.25, and the cumulative value before the charge compensation is DCCF=7−(−10.25)=17.25. Since-DCCF<52, DCCF≥13.33 hold, the compensation charge amount DCCA is the charge injection amount=0 and the charge discharge amount=16.67. The charge discharge amount is calculated by the Equation (5). The cumulative value after the charge compensation is DCCB=17.25+0−16.67=0.58. The excess/deficient gradation value to the capacitance driving is −DCCD=INT (0.58) =0, and the gradation value to the capacitance driving is DQ=128+0=128.

It is assumed that at the driving order 4, the gradation value DQ_GD=1024 is obtained. In this case, the excess/deficient gradation value is DCC_DQ=13.5, and the cumulative value before the charge compensation is DCCF=0.58−13.5=−12.92. Since −DCCF<52 and DCCF<13.33 hold, the compensation charge amount DCCA is the charge injection amount=0 and the charge discharge amount=0. The cumulative value after the charge compensation is DCCB=−12.92+0−16.67=−12.92. The excess/deficient gradation value to the capacitance driving is DCCD=−INT (−12.92)=13, and the gradation value to the capacitance driving is DQ=1024+13=1037.

If the charge discharge is not performed by the charge compensation circuit 90 at the driving order 3, the excess/deficient gradation value to the capacitance driving is −17, from the cumulative value before the charge compensation 17.25. This excess/deficient gradation value means accumulation of the shift of the gradation value of the capacitance driving with respect to the original gradation value. In this embodiment, since the charge compensation circuit 90 performs the charge discharge, the cumulative value is reduced by the discharge amount, and the cumulative value before the charge compensation becomes 0.58. As a result, the excess/deficient gradation value to the capacitance driving becomes 0, and the accumulation of the shift is reduced. In this manner, by repeating the compensation for the excess/deficient charge through the capacitance driving and the charge compensation with the charge compensation circuit 90, the charge conservation state of the output node NVQ is maintained as a whole.

In the above-described embodiment, a plurality of data lines is sequentially driven. It is assumed that among the plurality of data lines, the pth data line in the driving order is driven. The p is an integer of 1 or greater. In this case, the processing circuit 42 calculates the pth excess/deficient gradation value DCC_DQ that compensates for the excess/deficient charge amount at the pth data line in the driving order, and determines the cumulative value DCCF of the pth excess/deficient gradation value DCC_DQ and the first to p−1th excess/deficient gradation values DCC_DQ calculated when the first to p−1th data lines in the driving order are driven. When the cumulative value DCCF is equal to or greater than the threshold value, the processing circuit 42 causes the charge compensation circuit 90 to inject the compensation charge from to the output node NVQ or discharge the compensation charge from the output node NVQ.

According to this embodiment, when the cumulative value DCCF representing the cumulative excess/deficient charge amount is equal to or greater than the threshold value, the charge compensation with the charge compensation circuit 90 is performed. In this manner, the excess/deficient charges can be compensated for by using the compensation capacitor with the fixed capacitance value.

Note that in the example of FIG. 25, p=3 is obtained. In this case, the processing circuit 42 calculates the excess/deficient gradation value DCC_DQ=−10.25 of the driving order 3, and determines the cumulative value DCCF=17.25 of the excess/deficient gradation value DCC_DQ=0, −7 of the driving orders 1 and 2 and the excess/deficient gradation value DCC_DQ=−10.25 of the driving order 3. In the example of FIG. 25, since the threshold value of the charge discharge amount is 13.33 and DCCF=17.25≥13.33 holds, the processing circuit 42 causes the charge compensation circuit 90 to inject the compensation charge to the output node NVQ or output the compensation charge to the output node NVQ.

In this embodiment, when the cumulative value DCCF is smaller than the threshold value, the processing circuit 42 outputs the gradation data DQ [10:0] corrected based on the cumulative value DCCF to the capacitor driving circuit 20. When the cumulative value DCCF is equal to or greater than the threshold value, the processing circuit 42 subtracts the gradation value corresponding to the compensation charge from the cumulative value DCCF, and outputs the gradation data DQ [10:0] corrected based on the cumulative value DCCB after the subtraction to the capacitor driving circuit 20.

According to this embodiment, the excess/deficient charge is compensated through the capacitance driving by performing the capacitance driving with the gradation data DQ [10:0] corrected based on the cumulative value. Through this compensation, shift of the gradation value of the capacitance driving with respect to the original gradation value is accumulated, and the capacitance driving cannot compensate for the excess/deficient charge. In view of this, the charge compensation circuit 90 supplies the compensation charge and thus the accumulation of the shift can be reduced. In this manner, by repeating the compensation for the excess/deficient charge through the capacitance driving and the charge compensation with the charge compensation circuit 90, the charge conservation state of the output node NVQ is maintained as a whole.

Note that in the example of FIG. 25, at the driving order 2, the cumulative value DCCF=7 is smaller than the threshold value 13.33. The processing circuit 42 outputs the gradation data DQ [10:0] of the gradation value 256−7=249 corrected based on the cumulative value DCCF=7 to the capacitor driving circuit 20. At the driving order 3, the cumulative value DCCF=17.25 is equal to or greater than the threshold value 13.33. The processing circuit 42 subtracts the gradation value 16.67 corresponding to the compensation charge from the cumulative value DCCF=17.25, and outputs, to the capacitor driving circuit 20, the gradation data DQ [10:0] of the gradation value 128−0=128 corrected based on the cumulative value DCCB=0.58 after the subtraction.

5. Electronic Equipment

Figure 26:
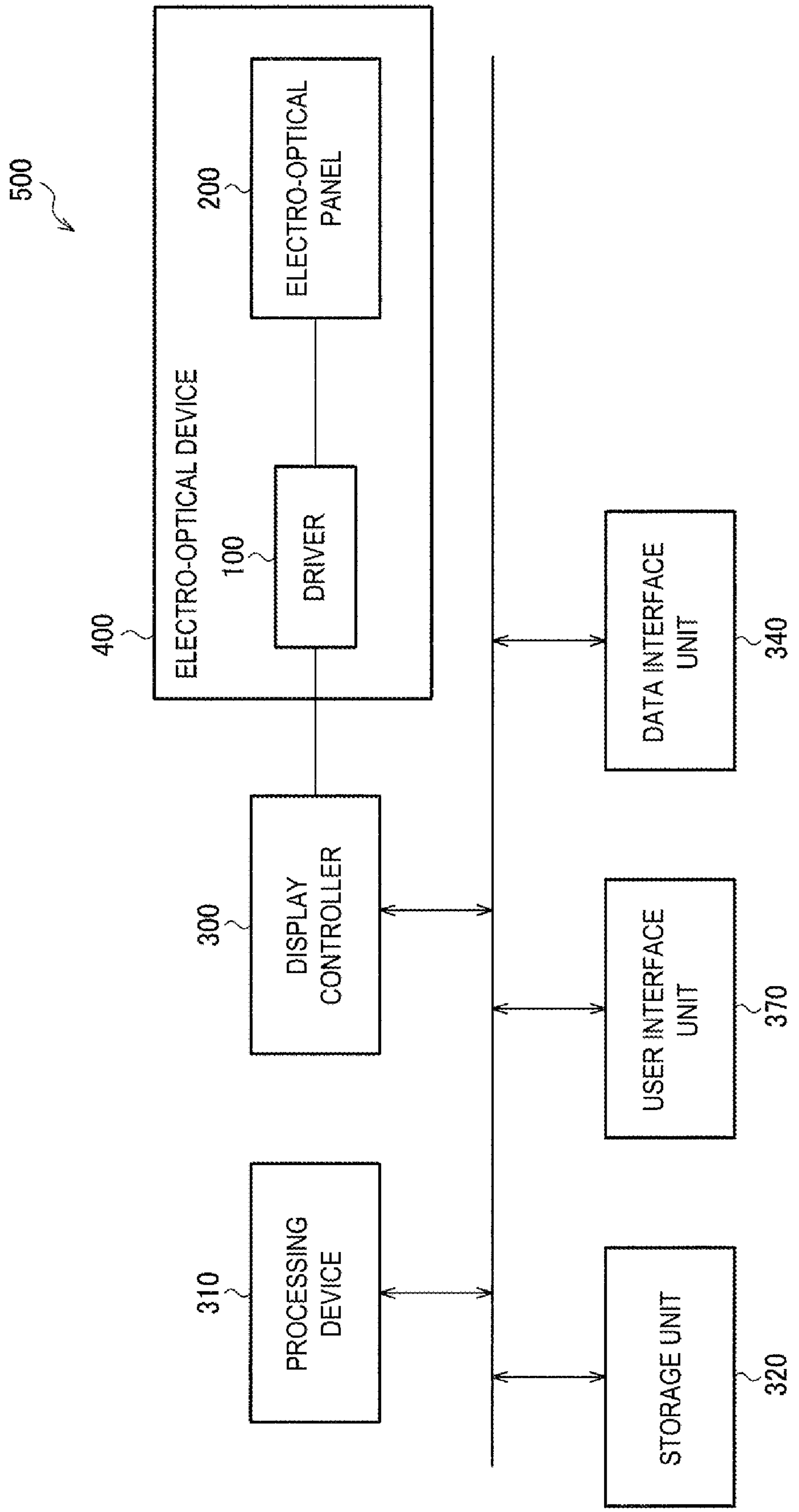
FIG. 26 illustrates an example of a configuration of an electronic apparatus.

FIG. 26 illustrates an example of a configuration of an electronic apparatus including the driver of this embodiment. Various apparatuses in which a display device is mounted are assumable as the electronic apparatus of this embodiment. Examples of the electronic equipment include a projector, a television device, an information processing device, a mobile information terminal, a car navigation system, and a mobile game terminal.

An electronic apparatus 500 includes the electro-optical device 400, the display controller 300, a processing device 310, a storage unit 320, a user interface unit 330, and a data interface unit 340. An electro-optical device 400 includes a driver 100 and an electro-optical panel 200.

The electro-optical panel 200 is a liquid crystal display panel of a matrix type, for example. Alternatively, the electro-optical panel 200 may be an EL display panel using a self-luminous element. EL is an abbreviation of Electro-Luminescence. The user interface unit 330 is an interface unit that receives various operations from the user. For example, it is composed of buttons, a mouse, a keyboard, a touch panel mounted in the electro-optical panel 200 and the like. The data interface unit 340 is an interface unit that inputs and outputs image data or control data. For example, it is a wired communication interface such as a USB, or a radio communication interface such as a wireless LAN. The storage unit 320 stores image data input from the data interface unit 340. Alternatively, the storage unit 320 functions as a working memory of the processing device 310 or the display controller 300. The processing device 310 performs various data processing and control processing of each unit of the electronic apparatus. The processing device 310 is a processor such as a CPU or a micro computer. The display controller 300 performs control processing of the driver 100. For example, the display controller 300 converts image data transferred from the data interface unit 340 or the storage unit 320 into a format that is receivable at the driver 100, and outputs the converted image data to the driver 100. The driver 100 drives the electro-optical panel 200 on the basis of the image data transferred from the display controller 300.

The above-described driver of this embodiment includes a data voltage output terminal, a capacitor driving circuit, a capacitor circuit, a processing circuit, and a charge compensation circuit. The data voltage output terminal is electrically connected to the data line through the data line switch of the electro-optical panel. The capacitor driving circuit outputs the first to nth capacitor driving voltages corresponding to gradation data to the first to nth capacitor driving nodes. The n is an integer of 2 or greater. The capacitor circuit includes first to nth capacitors provided between an output node that is a node of the data voltage output terminal and the first to nth capacitor driving nodes. The processing circuit calculates the excess/deficient charge amount that is the deficient charge amount or the excess charge amount of the output node when the data line switch is turned on. The charge compensation circuit includes a charge compensation capacitor circuit, and uses the charge compensation capacitor circuit to inject to the output node or output from the output node the compensation charge based on the excess/deficient charge amount calculated by the processing circuit.

According to this embodiment, the charge compensation circuit can compensate for the excess/deficient charge through the charge redistribution by using the charge compensation capacitor circuit. In this manner, the voltage of the data line can be speedily made asymptotically closer to the data voltage in comparison with the case where an amplifier circuit is used to compensate for the excess/deficient charge. Alternatively, even in the case where an amplifier circuit is further additionally used, the charge amount to be compensated by the amplifier circuit can be reduced.

In addition, in this embodiment, the voltage of the data line when the data line switch is off may be a precharge voltage. In this case, the processing circuit may calculate the excess/deficient charge amount that is generated by the difference between the target voltage corresponding to the gradation data and the precharge voltage when the data line switch is turned on from an off state.

According to this embodiment, by calculating the excess/deficient charge amount that is generated by the difference between the precharge voltage and the target voltage corresponding to the gradation data, the output node can be brought closer to the charge conservation state. In this manner, the voltage of the data line can be brought closer to the target voltage.

In addition, in this embodiment, the gradation value corresponding to the target voltage may be DQ_GD, the gradation value corresponding to the precharge voltage may be DPRE, the coefficient representing the ratio of the excess/deficient charge amount with respect to the difference between the target voltage and the precharge voltage may be Coef, and the excess/deficient gradation value that compensate for the excess/deficient charge amount may be DCC_DQ. In this case, the processing circuit may calculate the excess/deficient gradation value by DCC_DQ=(DQ_GD-DPRE)×Coef. The charge compensation circuit may inject to the output node or discharge from the output node the compensation charge on the basis of the excess/deficient gradation value.

According to this embodiment, the excess/deficient gradation value that is the gradation value corresponding to the excess/deficient charge amount is obtained through the above-mentioned calculation. By using the excess/deficient gradation value, the excess/deficient charge amount can be handled with reference to the charge amount corresponding to one gradation. For example, the capacitance value of the capacitor of the charge compensation capacitor circuit may be doubled, halved or the like with reference to the capacitance value of the first capacitor of the capacitor circuit. In this manner, the capacitor can compensate for the excess/deficient charge amount corresponding to two gradations or ½ gradation.

In addition, in this embodiment, the charge compensation capacitor circuit may include the first to mth compensation capacitors of which one end is connected to the output node. The charge compensation circuit may include first to mth compensation driving circuits that output the first to mth compensation signals based on the excess/deficient charge amount to the other ends of the first to mth compensation capacitors.

According to this embodiment, the other ends of the first to mth compensation capacitors are driven by the first to mth compensation signals based on the excess/deficient charge amount. In this manner, the compensation charge based on the excess/deficient charge amount is injected to the output node from the first to mth compensation capacitors or discharged from the output node.

In addition, in this embodiment, the processing circuit may output the set value of the charge compensation circuit on the basis of the cumulative value of the excess/deficient charge amount for each data line. The first to mth compensation driving circuits may output the first to mth compensation signals corresponding to the set value. When driven by the first to mth compensation signals, the first to mth compensation capacitors may inject to the output node or discharge from the output node the compensation charge corresponding to the excess/deficient charge amount.

By performing the charge compensation when a certain data line is driven, the output node is maintained in the charge conservation state, and the charge compensation is further performed with reference to that charge state when the next data line is driven. In this manner, the charge compensation is accumulated. In this embodiment, the set value of the charge compensation circuit is output based on the cumulative value of the excess/deficient charge amount for each data line, and thus the charge compensation is accumulated.

In addition, in this embodiment, the charge compensation capacitor circuit may include a first compensation capacitor. The charge compensation circuit may include first to third switches. One end of the first switch may be connected to the output node, and the other end may be connected to one end of the first compensation capacitor. The second switch may be provided between the high potential side power source node and the other end of the first switch. The third switch may be provided between the low potential side power source node and the other end of the first switch.

According to this embodiment, the one end of the first compensation capacitor CAV can be charged with the high potential side power source voltage when the second switch turns on, and the compensation charge can be injected from one end of the first compensation capacitor to the output node when the first switch turns on. One end of the first compensation capacitor can be charged with the low potential side power source voltage when the third switch turns on, and the compensation charge can be discharged from the output node to the one end of the first compensation capacitor when the first switch turns on.

In addition, in this embodiment, in the preparation period before the data line is driven, the first switch may be off, and the second switch or the third switch may be on. In the compensation period including the period in which the data line is driven, the first switch may be on, and the second switch and the third switch may be off.

According to this embodiment, one end of the first compensation capacitor can be charged with the high potential side power source voltage or the low potential side power source voltage in the preparation period. Further, in the compensation period, the compensation charge can be injected to the output node or the compensation charge can be discharged from the output node.

In addition, in this embodiment, the first compensation capacitor may be a compensating variable capacitance circuit of which the capacitance value is variable. The processing circuit may set the capacitance value of the compensating variable capacitance circuit on the basis of the excess/deficient charge amount.

According to this embodiment, when the capacitance value of the compensating variable capacitance circuit is set on the basis of the excess/deficient charge amount, the compensation charge corresponding to the excess/deficient charge amount is injected to the output node from the first compensation capacitor or discharged to the first compensation capacitor from the output node in the compensation period.

In addition, in this embodiment, a plurality of data lines may be sequentially driven. It is assumed that among the plurality of data lines, the pth data line in the driving order is driven. The p is an integer of 1 or greater. In this case, the processing circuit may calculate the pth excess/deficient gradation value that compensates for the excess/deficient charge amount at the pth data line in the driving order, and determine the cumulative value of the pth excess/deficient gradation value and the first to p−1th excess/deficient gradation values calculated when the first to p−1th data lines in the driving order are driven. The processing circuit may cause the charge compensation circuit to inject the compensation charge to the output node or discharge the compensation charge to the output node when the cumulative value is equal to or greater than the threshold value.

According to this embodiment, the charge compensation is performed by the charge compensation circuit when the cumulative value representing the cumulative excess/deficient charge amount is equal to or greater than the threshold value. In this manner, the excess/deficient charges can be compensated for by using the compensation capacitor with the fixed capacitance value.

In addition, in this embodiment, the processing circuit may output the gradation data corrected based on the cumulative value to the capacitor driving circuit when the cumulative value is smaller than the threshold value. When the cumulative value is equal to or greater than the threshold value, the processing circuit may subtract the gradation value corresponding to the compensation charge from the cumulative value, and output the gradation data corrected based on the cumulative value after the subtraction to the capacitor driving circuit.

According to this embodiment, by performing the capacitance driving with the gradation data corrected based on the cumulative value, the excess/deficient charge is compensated through the capacitance driving. Through this compensation, shift of the gradation value of the capacitance driving with respect to the original gradation value is accumulated, and the capacitance driving cannot compensate for the excess/deficient charge. In view of this, the charge compensation circuit supplies the compensation charge and thus the accumulation of the shift can be reduced.

In addition, in this embodiment, the charge compensation capacitor circuit may include a second compensation capacitor. The charge compensation circuit may include fourth to sixth switches. One end of the fourth switch may be connected to the output node, and the other end may be connected to one end of the second compensation capacitor. The fifth switch may be provided between the high potential side power source node and the other end of the fourth switch. The sixth switch may be provided between the low potential side power source node and the other end of the fourth switch.

According to this embodiment, the charge compensation can be alternately performed with the first compensation capacitor and the second compensation capacitor. That is, the compensation period of the charge compensation with the first compensation capacitor may be set as the preparation period for the charge compensation with the second compensation capacitor, and the preparation period for the charge compensation with the first compensation capacitor may be set as the compensation period of the charge compensation with the second compensation capacitor. In this manner, increase in the speed of the driving due to increase in the number of pixels or frame rate can be easily handled.

In addition, the electro-optical device of this embodiment includes any of the above-mentioned drivers, and the electro-optical panel.

In addition, the electronic equipment of this embodiment includes any of the above-mentioned drivers.

Although this embodiment has been described in detail above, it will be readily understood by those skilled in the art that many variations are possible that do not materially depart from the novel matters and effects of the present disclosure. Accordingly, all such variations shall be included within the scope of this disclosure. For example, a term that is mentioned at least once in the specification or drawings together with a different broader or synonymous term may be replaced by that different term at any point in the specification or drawings. All combinations of the embodiments and variations are also included within the scope of this disclosure. In addition, the configurations, operations and the like of the control circuit, the data line driving circuit, the driver, the electro-optical panel, the electro-optical device, the electronic equipment and the like are also not limited to those described in the embodiments, and various modifications may be made.

What is claimed is:

1. A driver comprising:

a data voltage output terminal electrically coupled to a data line through a data line switch of an electro-optical panel;

a capacitor driving circuit configured to output first to nth capacitor driving voltages corresponding to gradation data to first to nth capacitor driving nodes, n being an integer of 2 or greater;

a capacitor circuit including first to nth capacitors provided between an output node that is a node of the data voltage output terminal and the first to nth capacitor driving nodes;

a processing circuit configured to calculate an excess/deficient charge amount, the excess/deficient charge amount being a deficient charge amount or an excess charge amount of the output node when the data line switch is turned on; and a charge compensation circuit including a charge compensation capacitor circuit and configured to inject into the output node or discharge from the output node a compensation charge based on the excess/deficient charge amount calculated by the processing circuit, by using the charge compensation capacitor circuit, wherein in a case where a voltage of the data line when the data line switch is off is a precharge voltage, the processing circuit calculates the excess/deficient charge amount that is generated by a difference between the precharge voltage and a target voltage corresponding to the gradation data when the data line switch is turned on from an off state, the processing circuit calculates the excess/deficient gradation value by DCC_DQ=(DQ_GD−DPRE)×Coef, where a gradation value corresponding to the target voltage is DQ_GD, a gradation value corresponding to the precharge voltage is DPRE, a coefficient representing a ratio of the excess/deficient charge amount with respect to the difference between the target voltage and the precharge voltage is Coef, and an excess/deficient gradation value that compensates for the excess/deficient charge amount is DCC_DQ, and the charge compensation circuit injects to the output node or discharges from the output node the compensation charge based on the excess/deficient gradation value.

2. The driver according to claim 1, wherein the charge compensation capacitor circuit includes first to mth compensation capacitors of which one end is coupled to the output node, and the charge compensation circuit includes first to mth compensation driving circuits configured to output first to mth compensation signals based on the excess/deficient charge amount to the other end of the first to mth compensation capacitors.

3. The driver according to claim 2, wherein the processing circuit outputs a set value of the charge compensation circuit based on a cumulative value of the excess/deficient charge amount for each data line, the first to mth compensation driving circuits output the first to mth compensation signals corresponding to the set value, and when driven by the first to mth compensation signals, the first to mth compensation capacitors inject to the output node or discharge from the output node the compensation charge corresponding to the excess/deficient charge amount.

4. An electro-optical device comprising:

the driver according to claim 1, and the electro-optical panel.

5. An electronic apparatus comprising the driver according to claim 1.

6. A driver comprising:

a data voltage output terminal electrically coupled to a data line through a data line switch of an electro-optical panel;

a capacitor driving circuit configured to output first to nth capacitor driving voltages corresponding to gradation data to first to nth capacitor driving nodes, n being an integer of 2 or greater;

a capacitor circuit including first to nth capacitors provided between an output node that is a node of the data voltage output terminal and the first to nth capacitor driving nodes;

a processing circuit configured to calculate an excess/deficient charge amount, the excess/deficient charge amount being a deficient charge amount or an excess charge amount of the output node when the data line switch is turned on; and a charge compensation circuit including a charge compensation capacitor circuit and configured to inject into the output node or discharge from the output node a compensation charge based on the excess/deficient charge amount calculated by the processing circuit, by using the charge compensation capacitor circuit, wherein the charge compensation capacitor circuit includes a first compensation capacitor, and the charge compensation circuit includes:

a first switch of which one end is coupled to the output node, and the other end is coupled to one end of the first compensation capacitor, a second switch provided between a high potential side power source node and the other end of the first switch, and a third switch provided between a low potential side power source node and the other end of the first switch.

7. The driver according to claim 6, wherein in a preparation period before the data line is driven, the first switch is off and the second switch or the third switch is on, and in a compensation period including a period in which the data line is driven, the first switch is on and the second switch and the third switch are off.

8. The driver according to claim 6, wherein the first compensation capacitor is a compensating variable capacitance circuit of which a capacitance value is variable, and the processing circuit sets a capacitance value of the compensating variable capacitance circuit based on the excess/deficient charge amount.

9. The driver according to claim 6, wherein when a pth data line, in a driving order, of a plurality of data lines sequentially driven is driven and p is an integer of 1 or greater, the processing circuit calculates a pth excess/deficient gradation value that compensates for the excess/deficient charge amount at the pth data line in the driving order, and determines a cumulative value of the pth excess/deficient gradation value and first to p−1th excess/deficient gradation values calculated when the first to p−1th data lines in the driving order are driven, and when the cumulative value is equal to or greater than a threshold value, the processing circuit causes the charge compensation circuit to inject to the output node or discharge from the output node the compensation charge.

10. The driver according to claim 9, wherein when the cumulative value is smaller than the threshold value, the processing circuit outputs the gradation data corrected based on the cumulative value to the capacitor driving circuit, and when the cumulative value is equal to or greater than the threshold value, the processing circuit subtracts a gradation value corresponding to the compensation charge from the cumulative value, and outputs the gradation data corrected based on the cumulative value after the subtraction, to the capacitor driving circuit.

11. The driver according to claim 6, wherein the charge compensation capacitor circuit includes a second compensation capacitor, the charge compensation circuit includes:

a fourth switch of which one end is coupled to the output node, and the other end is coupled to one end of the second compensation capacitor, a fifth switch provided between the high potential side power source node and the other end of the fourth switch, and a sixth switch provided between the low potential side power source node and the other end of the fourth switch.

* * * * *